US007909688B2

(12) United States Patent
Yoshizawa

(10) Patent No.: US 7,909,688 B2
(45) Date of Patent: Mar. 22, 2011

(54) PLAYING METHOD AND GAMING MACHINE FOR A CARD GAME INCLUDING A PLURALITY OF CARD GAMES

(75) Inventor: Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 274 days.

(21) Appl. No.: 12/041,270

(22) Filed: Mar. 3, 2008

(65) Prior Publication Data

US 2008/0237987 A1 Oct. 2, 2008

(30) Foreign Application Priority Data

Apr. 2, 2007 (JP) ................................ 2007-096672

(51) Int. Cl.
*A63F 13/00* (2006.01)

(52) U.S. Cl. .............. 463/13; 273/292; 463/11; 463/12; 463/16; 463/17; 463/20; 463/22; 463/26; 463/27; 463/32

(58) Field of Classification Search .................. 273/292; 463/6–27, 302, 32
See application file for complete search history.

(56) References Cited

U.S. PATENT DOCUMENTS 5,098,107 A * 3/1992 Boylan et al. ................ 273/292
5,106,091 A * 4/1992 Comito .......................... 463/22
5,282,633 A * 2/1994 Boylan et al. ................ 273/306
5,366,228 A * 11/1994 Kangsanaraks .............. 273/292
5,395,119 A * 3/1995 Jacob et al. .................. 273/274
5,423,551 A * 6/1995 Stavinsky .................... 273/306
5,431,407 A * 7/1995 Hofberg et al. .............. 273/292
5,632,485 A * 5/1997 Woodland et al. ............ 273/292
5,636,843 A * 6/1997 Roberts ........................ 273/292
5,639,092 A * 6/1997 Macaisa ....................... 273/292
5,707,285 A * 1/1998 Place et al. ..................... 463/12
5,743,800 A * 4/1998 Huard et al. .................... 463/26
6,139,430 A * 10/2000 Huard et al. .................... 463/16
6,146,270 A * 11/2000 Huard et al. .................... 463/12
6,179,292 B1 * 1/2001 Aramapakul ................ 273/292
6,461,240 B1 * 10/2002 Perkins .......................... 463/13
6,698,758 B2 * 3/2004 Hodge .......................... 273/274
6,773,013 B2 * 8/2004 Caldwell ...................... 273/292
6,789,801 B2 * 9/2004 Snow ........................... 273/292
6,896,614 B2 * 5/2005 Romero .......................... 463/12
6,916,245 B1 * 7/2005 Vancura et al. ................. 463/26
6,932,343 B1 * 8/2005 Miller .......................... 273/292
7,056,215 B1 * 6/2006 Olive ............................. 463/27
7,175,522 B2 * 2/2007 Hartl .............................. 463/11
7,284,756 B2 * 10/2007 Pierce et al. .............. 273/121 B
7,309,065 B2 * 12/2007 Yoseloff et al. .............. 273/292

(Continued)

*Primary Examiner* — Gene Kim
*Assistant Examiner* — Alexander R Niconovich
(74) *Attorney, Agent, or Firm* — Oblon, Spivak, McClelland, Maier & Neustadt, L.L.P.

(57) ABSTRACT

Steps of accepting a first bet for participating in the first card game, accepting an optional second bet for participating in the second card game, disclosing as cards for the first card game a prescribed number of cards randomly selected from cards including cards having a first color as a color of a face showing a suit and a rank and cards having a second color as a color of a face showing a suit and rank, settling the first bet according to game rules of the first card game based on ranks of disclosed cards for the first card game, and determining a generation of a prize for the second card game based on colors of the faces of the disclosed cards for the first card games are included.

8 Claims, 22 Drawing Sheets

U.S. PATENT DOCUMENTS

| | | | | |
|---|---|---|---|---|
| 7,335,100 | B2 * | 2/2008 | Romero | 463/11 |
| 7,419,160 | B1 * | 9/2008 | D'Ambrosio | 273/292 |
| 7,631,874 | B2 * | 12/2009 | Webb | 273/292 |
| 7,780,520 | B2 * | 8/2010 | Baerlocher | 463/25 |
| 2006/0084505 | A1 * | 4/2006 | Yoseloff et al. | 463/42 |
| 2006/0183525 | A1 * | 8/2006 | Snow | 463/13 |
| 2007/0111786 | A1 * | 5/2007 | Snow | 463/27 |
| 2007/0114723 | A1 * | 5/2007 | Webb | 273/274 |
| 2008/0207292 | A1 * | 8/2008 | Yoshizawa | 463/12 |
| 2009/0149240 | A1 * | 6/2009 | Abe | 463/20 |
| 2010/0087245 | A1 * | 4/2010 | Johnson | 463/20 |

* cited by examiner

PLAYING METHOD AND GAMING MACHINE FOR A CARD GAME INCLUDING A PLURALITY OF CARD GAMES

CROSS REFERENCE TO RELATED APPLICATIONS

This application is based upon and claims the benefit of priority from the prior Japanese Patent Application No. 2007-096672, filed on Apr. 2, 2007, the entire contents of which are incorporated herein by reference.

BACKGROUND OF THE INVENTION

1. Field of the Invention

The present invention relates to a playing method and a gaming machine for a card game in which bets are made by using one set or plural sets of cards.

2. Description of the Related Art

Conventionally, there are various known card games in which bets are made by using one set or plural sets of cards. For example, in one such example called baccarat game, a participant of a card game makes a bet by guessing which one of a "Banker" and a "Player" will win (or they will tie).

Consequently, there is only one bet that can be made by a participant during one play of the card game, so that a density of a card game that can be enjoyed by a participant has been low despite of a time required for a card game. Such a situation is not limited to the baccarat game and commonly exists for a black jack and other card games as well.

On the other hand, in the U.S. Pat. No. 6,789,801B2, during the baccarat game, while carrying out a first game in which a participant makes a bet on any one of a Banker's win, a Player's win and a tie, a side bet in which a bet is made by guessing how much difference by which a Banker or a Player will win over an opponent is also carried out.

However, in the card game described in the U.S. Pat. No. 6,789,801B2, only one type of game (the baccarat game) is effectively carried out, so that there is no diversity in games.

SUMMARY OF THE INVENTION

The present invention has been achieved in order to solve the conventional problem described above, and has an object to provide a playing method of card games and a gaming machine capable of providing a satisfaction to participants.

A first aspect of the present invention is a method of playing a card game including a first card game and a second card game, the method comprising: (a) accepting a first bet for participating in the first card game; (b) accepting an optional second bet for participating in the second card game; (c) disclosing as cards for the first card game a prescribed number of cards randomly selected from cards including cards having a first color as a color of a face showing a suit and a rank and cards having a second color as a color of a face showing a suit and rank; (d) settling the first bet according to rules of the first card game, based on ranks of the disclosed cards for the first card game; and (e) determining a generation of a prize for the second card game, based on colors of the faces of the disclosed cards for the first card game.

According to the first aspect of the present invention, a generation of a prize of a second card game is determined according to a color of a face of a card disclosed for a first card game.

For this reason, every time the first card game is carried out once, a participant can make a second bet for the second card game as an option, along with a first bet for the first card game, and in the second card game, a prize of the second card game is generated according to a color of a face of a card disclosed in the first card game. In this way, it becomes possible for a participant to make a plurality of bets for mutually different first and second card games during one play of the card game.

Also, as the generation of the prize of the second card game is determined in a case where a color of a face of a card for the first card game is a particular color, when the first card game is executed, the second card game will be executed in conjunction with this. In this way, at a time of executing the second card game of a type different from the first card game, a procedure for the first card game that deals cards can also be utilized as a game procedure of the second card game, and an opportunity to participate in the second card game is given to the participant without changing the procedure of one play of the card game. Hence, it is possible to give an opportunity to make a plurality of bets for a plurality of card games easily, to the participant.

Also, as the generation of the prize of the second card game is determined in a case where a color of a face of a card disclosed for the first card game is a particular color, the generation of the prize of the second card game can be conveyed to the participant in an easily comprehensible state, while executing the first card game.

The method may further comprise executing a third card game for determining a size of the prize upon the generation of the prize being determined.

According to the above described configuration, when a generation of a prize in the second card game is determined, a third card game for determining a size of the prize according to this determination will be executed.

For this reason, when the generation of the prize is determined in the second card game, an opportunity for a new type of the third card game for determining the size of that prize will be given to the participant in addition.

In the second card game, the second bet from each of a plurality of participants of the first card game may be accepted and the generation of prizes for the plurality of participants having made the second bets may be determined, and a third card game for determining an order of sizes of the prizes for the plurality of participants may be executed upon the generation of the prizes for the plurality of participants being determined in the second card game.

According to the above described configuration, in a case where the generation of prize in the second card game is determined for a plurality of participants, an order of sizes of the prizes for these participants will be determined by a third card game. In this way, an opportunity of a new type of game in which the participants compete a determination of the order with each other is generated for the plurality of participants for which the prizes are generated in the second card game.

In the third card game, a prescribed number of cards may be dealt to each of the plurality of participants being targets of the generation of the prizes in the second card game, and the order may be determined according to the dealt cards.

According to the above described configuration, as new cards for the third card game are dealt to those participants for which the prizes are generated in the second card game, a satisfaction of being participating in a new card game can be provided to these participants.

The first card game may be a baccarat game.

According to the above described configuration, the baccarat game is executed as the first card game, and an opportunity for making a bet for a second card game different from the baccarat game and a prize according to that bet will be given to participants during that card game. In this way, the participants can enjoy the fun of the other card game while carrying out the baccarat game.

A second aspect of the present invention is a method of playing a card game including a first card game and a second card game, the method comprising: (a) accepting a first bet for participating in the first card game; (b) accepting an optional second bet for participating in the second card game; (c) disclosing as cards for the first card game a prescribed number of cards randomly selected from cards including cards having a first color as a color of a face showing a suit and a rank and cards having a second color as a color of a face showing a suit and rank; (d) settling the first bet according to rules of the first card game, based on ranks of the disclosed cards for the first card game; (e) determining a generation of a prize for the second card game, based on colors of the faces of the disclosed cards for the first card game; and (f) executing a third card game for determining a size of the prize upon the generation of the prize being determined.

According to the second aspect of the present invention, a generation of a prize of a second card game is determined according to a color of a face of a card disclosed for a first card game, and when the generation of that prize is determined, a size of the prize is determined by a third card game.

For this reason, every time the first card game is carried out once, a participant can make a second bet for the second card game as an option, along with a first bet for the first card game, and in the second card game, a prize of the second card game is generated according to a color of a face of a card disclosed in the first card game. In this way, it becomes possible for a participant to make a plurality of bets for mutually different first and second card games during one play of the card game.

Also, as the generation of the prize of the second card game is determined in a case where a color of a face of a card for the first card game is a particular color, when the first card game is executed, the second card game will be executed in conjunction with this. In this way, at a time of executing the second card game of a type different from the first card game, a procedure for the first card game that deals cards can also be utilized as a game procedure of the second card game, and an opportunity to participate in the second card game is given to the participant without changing the procedure of one play of the card game. Hence, it is possible to give an opportunity to make a plurality of bets for a plurality of card games easily, to the participant.

Also, as the generation of the prize of the second card game is determined in a case where a color of a face of a card disclosed for the first card game is a particular color, the generation of the prize of the second card game can be conveyed to the participant in an easily comprehensible state, while executing the first card game.

Also, when a generation of a prize in the second card game is determined, a third card game for determining a size of the prize according to this determination will be executed. For this reason, when the generation of the prize is determined in the second card game, an opportunity for a new type of the third card game for determining the size of that prize will be given to the participant in addition. In this way, it becomes possible to give a satisfaction to participants.

A third aspect of the present invention is a method of playing a card game including a first card game and a second card game, the method comprising: (a) accepting each of first bets for each of a plurality of participants to participate in the first card game; (b) accepting each of optional second bets for each of the plurality of participants of the first card game to participate in the second card game; (c) disclosing as cards for the first card game a prescribed number of cards randomly selected from cards including cards having a first color as a color of a face showing a suit and a rank and cards having a second color as a color of a face showing a suit and rank; (d) settling the first bets according to rules of the first card game, based on ranks of the disclosed cards for the first card game; (e) determining a generation of prizes for the second card game, based on colors of the faces of the disclosed cards for the first card game; and (f) executing a third card game for determining an order of sizes of the prizes for the plurality of participants of the second card game upon the generation of the prizes being determined.

According to the third aspect of the present invention, a generation of a prize of a second card game is determined according to a color of a face of a card disclosed for a first card game, and when the generation of that prize is determined, a size of the prize is determined by a third card game.

For this reason, every time the first card game is carried out once, a participant can make a second bet for the second card game as an option, along with a first bet for the first card game, and in the second card game, a prize of the second card game is generated according to a color of a face of a card disclosed in the first card game. In this way, it becomes possible for a participant to make a plurality of bets for mutually different first and second card games during one play of the card game.

Also, as the generation of the prize of the second card game is determined in a case where a color of a face of a card for the first card game is a particular color, when the first card game is executed, the second card game will be executed in conjunction with this. In this way, at a time of executing the second card game of a type different from the first card game, a procedure for the first card game that deals cards can also be utilized as a game procedure of the second card game, and an opportunity to participate in the second card game is given to the participant without changing the procedure of one play of the card game. Hence, it is possible to give an opportunity to make a plurality of bets for a plurality of card games easily, to the participant.

Also, as the generation of the prize of the second card game is determined in a case where a color of a face of a card disclosed for the first card game is a particular color, the generation of the prize of the second card game can be conveyed to the participant in an easily comprehensible state, while executing the first card game.

Also, in a case where the generation of prize in the second card game is determined for a plurality of participants, an order of sizes of the prizes for these participants will be determined by a third card game. In this way, an opportunity of a new type of game in which the participants compete a determination of the order with each other is generated for the plurality of participants for which the prizes are generated in the second card game.

A fourth aspect of the present invention is a method of playing a card game including a baccarat game and an optional card game, the method comprising: (a) accepting a first bet for participating in the baccarat game; (b) accepting a second bet for participating in the optional card game; (c) dealing two cards randomly selected from cards including cards having a first color as a color of a face showing a suit and a rank and cards having a second color as a color of a face showing a suit and rank, as cards for the baccarat game to each of a first area and a second area; (d) disclosing the cards dealt to the first area and the second area; (e) determining whether or not to additionally deal to and disclose a card for the baccarat game in at least one of the first area and the second area according to rules of the baccarat game, based on ranks of the cards dealt to and disclosed in the first area and the second area, and executing a result of that determination; (f) determining any one of win, lose and tie among the cards dealt to the first area and the cards dealt to the second area according to the rules of the baccarat game, based on the ranks of the cards dealt to and disclosed in the first area and the second area; (g) settling the first bet according to the rules of the baccarat game, based on the determined win, lose or tie; and (h) determining a generation of a prize for the optional card game, based on colors of the faces of disclosed cards for the baccarat game, according to rules of the optional card game.

According to the fourth aspect of the present invention, a generation of a prize of an optional card game is determined according to a color of a face of a card disclosed for the baccarat game.

For this reason, every time the baccarat game is carried out once, a participant can make a second bet for the optional card game as an option, along with a first bet for the baccarat game, and in the optional card game, a prize of the optional card game is generated according to a color of a face of a card disclosed in the baccarat game. In this way, it becomes possible for a participant to make a plurality of bets for mutually different two card games during one play of the card game.

Also, as the generation of the prize of the optional card game is determined in a case where a color of a face of a card for the baccarat game is a particular color, when the baccarat game is executed, the optional card game will be executed in conjunction with this. In this way, at a time of executing the optional card game of a type different from the baccarat game, a procedure for the baccarat game that deals cards can also be utilized as a game procedure of the optional card game, and an opportunity to participate in the optional card game is given to the participant without changing the procedure of one play of the card game. Hence, it is possible to give an opportunity to make a plurality of bets for a plurality of card games easily, to the participant.

Also, as the generation of the prize of the optional card game is determined in a case where a color of a face of a card disclosed for the baccarat game is a particular color, the generation of the prize of the optional card game can be conveyed to the participant in an easily comprehensible state, while executing the baccarat game.

A fifth aspect of the present invention is a method of playing a card game including a baccarat game and an optional card game, the method comprising: (a) accepting a first bet for participating in the baccarat game; (b) accepting a second bet for participating in the optional card game; (c) dealing two cards randomly selected from cards including cards having a first color as a color of a face showing a suit and a rank and cards having a second color as a color of a face showing a suit and rank, as cards for the baccarat game to each of a first area and a second area; (d) disclosing the cards dealt to the first area and the second area; (e) determining whether or not to additionally deal to and disclose a card for the baccarat game in at least one of the first area and the second area according to rules of the baccarat game, based on ranks of the cards dealt to and disclosed in the first area and the second area, and executing a result of that determination; (f) determining any one of win, lose and tie among the cards dealt to the first area and the cards dealt to the second area according to the rules of the baccarat game, based on the ranks of the cards dealt to and disclosed in the first area and the second area; (g) settling the first bet according to the rules of the baccarat game, based on the determined win, lose or tie; (h) determining a generation of a prize for the optional card game, based on colors of the faces of disclosed cards for the baccarat game, according to rules of the optional card game; and (i) executing a supplementary card game for determining a size of the prize upon the generation of the prize being determined.

According to the fifth aspect of the present invention, a generation of a prize of an optional card game is determined according to a color of a face of a card disclosed for the baccarat game, and when the generation of that prize is determined, a size of the prize of the optional card game is determined by a supplementary card game.

For this reason, every time the baccarat game is carried out once, a participant can make a second bet for the optional card game as an option, along with a first bet for the baccarat game, and in the optional card game, a prize of the optional card game is generated according to a color of a face of a card disclosed in the baccarat game. In this way, it becomes possible for a participant to make a plurality of bets for mutually different two card games during one play of the card game.

Also, as the generation of the prize of the optional card game is determined in a case where a color of a face of a card for the baccarat game is a particular color, when the baccarat game is executed, the optional card game will be executed in conjunction with this. In this way, at a time of executing the optional card game of a type different from the baccarat game, a procedure for the baccarat game that deals cards can also be utilized as a game procedure of the optional card game, and an opportunity to participate in the optional card game is given to the participant without changing the procedure of one play of the card game. Hence, it is possible to give an opportunity to make a plurality of bets for a plurality of card games easily, to the participant.

Also, as the generation of the prize of the optional card game is determined in a case where a color of a face of a card disclosed for the baccarat game is a particular color, the generation of the prize of the optional card game can be conveyed to the participant in an easily comprehensible state, while executing the baccarat game.

Also, when a generation of a prize in the optional card game is determined, a supplementary card game for determining a size of the prize according to this determination will be executed. For this reason, when the generation of the prize is determined in the optional card game, an opportunity for a new type of the supplementary card game for determining the size of that prize will be given to the participant in addition. In this way, it becomes possible to give a satisfaction to participants.

A sixth aspect of the present invention is a method of playing a card game including a baccarat game and an optional card game, the method comprising: (a) accepting each of first bets for each of a plurality of participants to participate in the baccarat game; (b) accepting each of second bets for each of the plurality of participants of the baccarat game to participate in the optional card game; (c) dealing two cards randomly selected from cards including cards having a first color as a color of a face showing a suit and a rank and cards having a second color as a color of a face showing a suit and rank, as cards for the baccarat game to each of a first area and a second area; (d) disclosing the cards dealt to the first area and the second area; (e) determining whether or not to additionally deal to and disclose a card for the baccarat game in at least one of the first area and the second area according to rules of the baccarat game, based on ranks of the cards dealt to and disclosed in the first area and the second area, and executing a result of that determination; (f) determining any one of win, lose and tie among the cards dealt to the first area and the cards dealt to the second area according to the rules of the baccarat game, based on the ranks of the cards dealt to and disclosed in the first area and the second area; (g) settling the first bet according to the rules of the baccarat game, based on the determined win, lose or tie; (h) determining a generation of prizes for the optional card game, based on colors of the faces of disclosed cards for the baccarat game, according to rules of the optional card game; and (i) executing a supplementary card game for determining an order of sizes of the prizes for the plurality of participants of the optional card game, upon the generation of the prizes being determined.

According to the sixth aspect of the present invention, a generation of a prize of an optional card game is determined according to a color of a face of a card disclosed for the baccarat game, and when the generation of that prize is determined, a size of the prize of the optional card game is determined by a supplementary card game.

For this reason, every time the baccarat game is carried out once, a participant can make a second bet for the optional card game as an option, along with a first bet for the baccarat game, and in the optional card game, a prize of the optional card game is generated according to a color of a face of a card disclosed in the baccarat game. In this way, it becomes possible for a participant to make a plurality of bets for mutually different two card games during one play of the card game.

Also, as the generation of the prize of the optional card game is determined in a case where a color of a face of a card for the baccarat game is a particular color, when the baccarat game is executed, the optional card game will be executed in conjunction with this. In this way, at a time of executing the optional card game of a type different from the baccarat game, a procedure for the baccarat game that deals cards can also be utilized as a game procedure of the optional card game, and an opportunity to participate in the optional card game is given to the participant without changing the procedure of one play of the card game. Hence, it is possible to give an opportunity to make a plurality of bets for a plurality of card games easily, to the participant.

Also, as the generation of the prize of the optional card game is determined in a case where a color of a face of a card disclosed for the baccarat game is a particular color, the generation of the prize of the optional card game can be conveyed to the participant in an easily comprehensible state, while executing the baccarat game.

Also, in a case where the generation of prizes in the optional card game is determined for a plurality of participants, an order of sizes of the prizes for these participants will be determined by a supplementary card game. In this way, an opportunity of a new type of game in which the participants compete a determination of the order with each other is generated for the plurality of participants for which the prizes are generated in the optional card game.

A seventh aspect of the present invention is a gaming machine, comprising: a gaming terminal configured to accept bets for participating in a card game including a first card game and a second card game; a display configured to display the first card game and the second card game; and a controller configured for an execution of the card game to, (a) accept a first bet for participating in the first card game, (b) accept a second bet for participating in the second card game, (c) display on the display suits and ranks of cards for the first card game, the suits and ranks being superposed on images of front faces of the cards for the first card game, (d) settle the first bet according to rules of the first card game, based on ranks of the displayed cards for the first card game, (e) randomly change colors of the images of the front faces of the cards for the first card game displayed on the display, and (f) determine a generation of a prize for the second card game, based on the changed colors.

According to the seventh aspect of the present invention, a generation of a prize of a second card game is determined according to a color of an image of a front face of a card displayed for a first card game.

For this reason, every time the first card game is carried out once, a participant can make a second bet for the second card game as an option, along with a first bet for the first card game, and in the second card game, a prize of the second card game is generated according to a color of a face of a card displayed in the first card game. In this way, it becomes possible for a participant to make a plurality of bets for mutually different first and second card games during one play of the card game.

Also, as the generation of the prize of the second card game is determined in a case where a color of an image of a front face of a card for the first card game is a particular color, when the first card game is executed, the second card game will be executed in conjunction with this. In this way, at a time of executing the second card game of a type different from the first card game, a procedure for the first card game that displays images of cards can also be utilized as a game procedure of the second card game, and an opportunity to participate in the second card game is given to the participant without changing the procedure of one play of the card game. Hence, it is possible to give an opportunity to make a plurality of bets for a plurality of card games easily, to the participant.

Also, as the generation of the prize of the second card game is determined in a case where a color of an image of a front face of a card displayed for the first card game is a particular color, the generation of the prize of the second card game can be conveyed to the participant in an easily comprehensible state, while executing the first card game.

The gaming machine may further comprise a second display configured to display a third card game associated with the second card game, and the controller may be configured to execute the third card game for determining a size of the prize upon the generation of the prize for the second card game being determined.

According to the above described configuration, when a generation of a prize in the second card game is determined, a third card game for determining a size of the prize according to this determination will be executed.

For this reason, when the generation of the prize is determined in the second card game, an opportunity for a new type of the third card game for determining the size of that prize will be given to the participant in addition.

The gaming machine may further comprise a second display configured to display a third card game associated with the second card game, and the controller may be configured to accept the second bet from each of a plurality of participants of the first card game, and determine the generation of prizes for the plurality of participants having made second bets, and execute the third card game for determining an order of sizes of the prizes for the plurality of participants, the prizes for the second card game being generated for the plurality of participants.

According to the above described configuration, in a case where the generation of prize in the second card game is determined for a plurality of participants, an order of sizes of the prizes for these participants will be determined by a third card game. In this way, an opportunity of a new type of game in which the participants compete a determination of the order with each other is generated for the plurality of participants for which the prizes are generated in the second card game.

In the third card game, the controller may be configured to allocate a prescribed number of cards to each of the plurality of participants being targets of the generation of the prizes in the second card game, disclose the allocated cards on the second display, and determine the order according to the disclosed cards.

According to the above described configuration, as new cards for the third card game are displayed to those participants for which the prizes are generated in the second card game, a satisfaction of being participating in a new card game can be provided to these participants.

The first card game may be a baccarat game.

According to the above described configuration, the baccarat game is executed as the first card game, and an opportunity for making a bet for a second card game different from the baccarat game and a prize according to that bet will be given to participants during that card game. In this way, the participants can enjoy the fun of the other card game while carrying out the baccarat game.

An eighth aspect of the present invention is a gaming machine, comprising: a gaming terminal configured to accept bets for participating in a card game including a first card game and a second card game; a first display configured to display the first card game and the second card game; a second display configured to display a third card game associated with the second card game; and a controller configured for an execution of the card game to, (a) accept a first bet for participating in the first card game, (b) accept a second bet for participating in the second card game, (c) display on the display suits and ranks of cards for the first card game, the suits and ranks being superposed on images of front faces of the cards for the first card game, (d) settle the first bet according to rules of the first card game, based on ranks of the displayed cards for the first card game, (e) randomly change colors of the images of the front faces of the cards for the first card game displayed on the first display, (f) determine a generation of a prize for the second card game, based on the changed colors, and (g) execute the third card game for determining a size of the prize upon the generation of the prize being determined.

According to the eighth aspect of the present invention, a generation of a prize of a second card game is determined according to a color of an image of a front face of a card displayed for a first card game, and when the generation of that prize is determined, a size of the prize is determined by a third card game.

For this reason, every time the first card game is carried out once, a participant can make a second bet for the second card game as an option, along with a first bet for the first card game, and in the second card game, a prize of the second card game is generated according to a color of an image of a front face of a card displayed in the first card game. In this way, it becomes possible for a participant to make a plurality of bets for mutually different first and second card games during one play of the card game.

Also, as the generation of the prize of the second card game is determined in a case where a color of an image of a front face of a card for the first card game is a particular color, when the first card game is executed, the second card game will be executed in conjunction with this. In this way, at a time of executing the second card game of a type different from the first card game, a procedure for the first card game that displays images of cards can also be utilized as a game procedure of the second card game, and an opportunity to participate in the second card game is given to the participant without changing the procedure of one play of the card game. Hence, it is possible to give an opportunity to make a plurality of bets for a plurality of card games easily, to the participant.

Also, as the generation of the prize of the second card game is determined in a case where a color of an image of a front face of a card displayed for the first card game is a particular color, the generation of the prize of the second card game can be conveyed to the participant in an easily comprehensible state, while executing the first card game.

Also, when a generation of a prize in the second card game is determined, a third card game for determining a size of the prize according to this determination will be executed. For this reason, when the generation of the prize is determined in the second card game, an opportunity for a new type of the third card game for determining the size of that prize will be given to the participant in addition. In this way, it becomes possible to give a satisfaction to participants.

A ninth aspect of the present invention is a gaming machine, comprising: a gaming terminal configured to accept bets for participating in a card game including a first card game and a second card game; a first display configured to display the first card game and the second card game; a second display configured to display a third card game associated with the second card game; and a controller configured for an execution of the card game to, (a) accept each of first bets for each of a plurality of participants to participate in the first card game, (b) accept each of second bets for each of the plurality of participants of the first game to participate in the second card game, (c) display on the display suits and ranks of cards for the first card game, the suits and ranks of cards being superposed on images of front faces of the cards for the first card game, (d) settle the first bets according to rules of the first card game, based on ranks of the displayed cards for the first card game, (e) randomly change colors of the images of the front faces of the cards for the first card game displayed on the first display, (f) determine a generation of prizes for the second card game, based on the changed colors, and (g) execute the third card game for determining an order of sizes of the prizes for the plurality of participants of the second card game upon the generation of the prizes being determined.

According to the ninth aspect of the present invention, a generation of a prize of a second card game is determined according to a color of an image of a front face of a card displayed for a first card game, and when the generation of that prize is determined, a size of the prize is determined by a third card game.

For this reason, every time the first card game is carried out once, a participant can make a second bet for the second card game as an option, along with a first bet for the first card game, and in the second card game, a prize of the second card game is generated according to a color of an image of a front face of a card displayed in the first card game. In this way, it becomes possible for a participant to make a plurality of bets for mutually different first and second card games during one play of the card game.

Also, as the generation of the prize of the second card game is determined in a case where a color of an image of a front face of a card for the first card game is a particular color, when the first card game is executed, the second card game will be executed in conjunction with this. In this way, at a time of executing the second card game of a type different from the first card game, a procedure for the first card game that displays images of cards can also be utilized as a game procedure of the second card game, and an opportunity to participate in the second card game is given to the participant without changing the procedure of one play of the card game. Hence, it is possible to give an opportunity to make a plurality of bets for a plurality of card games easily, to the participant.

Also, as the generation of the prize of the second card game is determined in a case where a color of an image of a front face of a card displayed for the first card game is a particular color, the generation of the prize of the second card game can be conveyed to the participant in an easily comprehensible state, while executing the first card game.

Also, in a case where the generation of prize in the second card game is determined for a plurality of participants, an order of sizes of the prizes for these participants will be determined by a third card game. In this way, an opportunity of a new type of game in which the participants compete a determination of the order with each other is generated for the plurality of participants for which the prizes are generated in the second card game.

A tenth aspect of the present invention is a gaming machine, comprising: a gaming terminal configured to accept bets for participating in a card game including a baccarat game and an optional card game; a display configured to display the baccarat game and the optional card game; a controller configured for an execution of the card game to, (a) accept a first bet for participating in the baccarat game, (b) accept a second bet for participating in the optional card game, (c) display images of two cards for the baccarat game in each of a first area and a second area of the display, suits and ranks being superposed on images of front faces of the two cards, (d) determine whether or not to additionally display an image of a card for the baccarat game in at least one of the first area and the second area according to rules of the baccarat game, based on ranks of the displayed cards for the baccarat game, and execute a result of that determination, (e) determine any one of win, lose and tie among the cards displayed in the first area and the cards displayed in the second area according to the rules of the baccarat game, based on the ranks of the cards displayed in the first area and the ranks of the cards displayed in the second area, (f) settle the first bet according to the rules of the baccarat game, based on the determined win, lose or tie, (g) randomly change colors of the images of the front faces of the cards displayed on the display, and (h) determine a generation of a prize for the optional card game, based on the changed colors.

According to the tenth aspect of the present invention, a generation of a prize of an optional card game is determined according to a color of an image of a front face of a card displayed for the baccarat game.

For this reason, every time the baccarat game is carried out once, a participant can make a second bet for the optional card game as an option, along with a first bet for the baccarat game, and in the optional card game, a prize of the optional card game is generated according to a color of an image of a front face of a card displayed in the baccarat game. In this way, it becomes possible for a participant to make a plurality of bets for mutually different two card games during one play of the card game.

Also, as the generation of the prize of the optional card game is determined in a case where a color of an image of a front face of a card for the baccarat game is a particular color, when the baccarat game is executed, the optional card game will be executed in conjunction with this. In this way, at a time of executing the optional card game of a type different from the baccarat game, a procedure for the baccarat game that displays images of cards can also be utilized as a game procedure of the optional card game, and an opportunity to participate in the optional card game is given to the participant without changing the procedure of one play of the card game. Hence, it is possible to give an opportunity to make a plurality of bets for a plurality of card games easily, to the participant.

Also, as the generation of the prize of the optional card game is determined in a case where a color of an image of a front face of a card displayed for the baccarat game is a particular color, the generation of the prize of the optional card game can be conveyed to the participant in an easily comprehensible state, while executing the baccarat game.

An eleventh aspect of the present invention is a gaming machine, comprising: a gaming terminal configured to accept bets for participating in a card game including a baccarat game and an optional card game; a first display configured to display the baccarat game and the optional card game; a second display configured to display a supplementary card game associated with the optional card game; and a controller configured for an execution of the card game to, (a) accept a first bet for participating in the baccarat game, (b) accept a second bet for participating in the optional card game, (c) display images of two cards for the baccarat game in each of a first area and a second area of the first display, suits and ranks being superposed on images of front faces of the two cards, (d) determine whether or not to additionally display an image of a card for the baccarat game in at least one of the first area and the second area according to rules of the baccarat game, based on ranks of the displayed cards for the baccarat game, and execute a result of that determination, (e) determine any one of win, lose and tie among the cards displayed in the first area and the cards displayed in the second area according to the rules of the baccarat game, based on the ranks of the cards displayed in the first area and the ranks of the cards displayed in the second area, (f) settle the first bet according to the rules of the baccarat game, based on the determined win, lose or tie, and (g) randomly change colors of the images of the front faces of the cards displayed on the first display, (h) determine a generation of a prize for the optional card game, based on the changed colors, and (i) execute the supplementary card game for determining a size of the prize upon the generation of the prize being determined.

According to the eleventh aspect of the present invention, a generation of a prize of an optional card game is determined according to a color of an image of a front face of a card displayed for the baccarat game, and when the generation of that prize is determined, a size of the prize of the optional card game is determined by a supplementary card game.

For this reason, every time the baccarat game is carried out once, a participant can make a second bet for the optional card game as an option, along with a first bet for the baccarat game, and in the optional card game, a prize of the optional card game is generated according to a color of an image of a front face of a card displayed in the baccarat game. In this way, it becomes possible for a participant to make a plurality of bets for mutually different two card games during one play of the card game.

Also, as the generation of the prize of the optional card game is determined in a case where a color of an image of a front face of a card for the baccarat game is a particular color, when the baccarat game is executed, the optional card game will be executed in conjunction with this. In this way, at a time of executing the optional card game of a type different from the baccarat game, a procedure for the baccarat game that displays images of cards can also be utilized as a game procedure of the optional card game, and an opportunity to participate in the optional card game is given to the participant without changing the procedure of one play of the card game. Hence, it is possible to give an opportunity to make a plurality of bets for a plurality of card games easily, to the participant.

Also, as the generation of the prize of the optional card game is determined in a case where a color of an image of a front face of a card displayed for the baccarat game is a particular color, the generation of the prize of the optional card game can be conveyed to the participant in an easily comprehensible state, while executing the baccarat game.

Also, when a generation of a prize in the optional card game is determined, a supplementary card game for determining a size of the prize according to this determination will be executed. For this reason, when the generation of the prize is determined in the optional card game, an opportunity for a new type of the supplementary card game for determining the size of that prize will be given to the participant in addition. In this way, it becomes possible to give a satisfaction to participants.

A twelfth aspect of the present invention is a gaming machine, comprising: a gaming terminal configured to accept bets for participating in a card game including a baccarat game and an optional card game; a first display configured to display the baccarat game and the optional card game; a second display configured to display a supplementary card game associated with the optional card game; and a controller configured for an execution of the card game to, (a) accept each of first bet for each of a plurality of participants to participate in the baccarat game, (b) accept each of second bets for each of the plurality of participants of the baccarat game to participate in the optional card game, (c) display images of two cards for the baccarat game in each of a first area and a second area of the first display, suits and ranks being superposed on images of front faces of the two cards, (d) determine whether or not to additionally display an image of a card for the baccarat game in at least one of the first area and the second area according to rules of the baccarat game, based on ranks of the displayed cards for the baccarat game, and execute a result of that determination, (e) determine any one of win, lose and tie among the cards displayed in the first area and the cards displayed in the second area according to the rules of the baccarat game, based on the ranks of the cards displayed in the first area and the ranks of the cards displayed in the second area, (f) settle the first bets according to the rules of the baccarat game, based on determined win, lose or tie, and (g) randomly change colors of the images of the front faces of the cards displayed on the first display, (h) determine a generation of prizes for the optional card game, based on the changed colors, and (i) execute the supplementary card game for determining an order of sizes of the prizes for the plurality of participants of the optional card game upon the generation of the prizes being determined.

According to the twelfth aspect of the present invention, a generation of a prize of an optional card game is determined according to a color of an image of a front face of a card displayed for the baccarat game, and when the generation of that prize is determined, a size of the prize of the optional card game is determined by a supplementary card game.

For this reason, every time the baccarat game is carried out once, a participant can make a second bet for the optional card game as an option, along with a first bet for the baccarat game, and in the optional card game, a prize of the optional card game is generated according to a color of an image of a front face of a card displayed in the baccarat game. In this way, it becomes possible for a participant to make a plurality of bets for mutually different two card games during one play of the card game.

Also, as the generation of the prize of the optional card game is determined in a case where a color of an image of a face of a card for the baccarat game is a particular color, when the baccarat game is executed, the optional card game will be executed in conjunction with this. In this way, at a time of executing the optional card game of a type different from the baccarat game, a procedure for the baccarat game that displays images of cards can also be utilized as a game procedure of the optional card game, and an opportunity to participate in the optional card game is given to the participant without changing the procedure of one play of the card game. Hence, it is possible to give an opportunity to make a plurality of bets for a plurality of card games easily, to the participant.

Also, as the generation of the prize of the optional card game is determined in a case where a color of an image of a front face of a card displayed for the baccarat game is a particular color, the generation of the prize of the optional card game can be conveyed to the participant in an easily comprehensible state, while executing the baccarat game.

Also, in a case where the generation of prizes in the optional card game is determined for a plurality of participants, an order of sizes of the prizes for these participants will be determined by a supplementary card game. In this way, an opportunity of a new type of game in which the participants compete a determination of the order with each other is generated for the plurality of participants for which the prizes are generated in the optional card game.

DETAILED DESCRIPTION OF THE EMBODIMENTS

First Embodiment

In the following, the characteristic portions of the first embodiment of the present invention will be described with references to FIG. 1 to FIG. 7. Among these figures, FIG. 1 is a flow chart showing an outline of a playing method of card games according to the first embodiment of the present invention, and FIG. 2 and FIG. 4 to FIG. 7 are plan views of a table on which card games according to the first embodiment of the present invention are to be executed.

In the card games according to this embodiment, there are provided a plurality of cards in which cards for which a color of a face showing a suit and a rank is a first color (white, for example) and cards for which that color is a second color (a particular color such as gold, for example) are mixed, and a prescribed number (four, for example) of cards randomly selected from them will be dealt for a first card game (a baccarat game in this embodiment).

In a case where a card for which the color of the face showing the suit and the rank is the second color (particular color) appears among these dealt cards, a prize (payouts, awards) of a second game is generated. Namely, in the second card game, a target of betting is whether a card in the particular color appears among cards dealt in the first card game or not, and a prize is generated for those participants who made bets in that second card game when a card in the particular color appeared. In this way, the second card game is executed along with the first card game.

Figure 1:
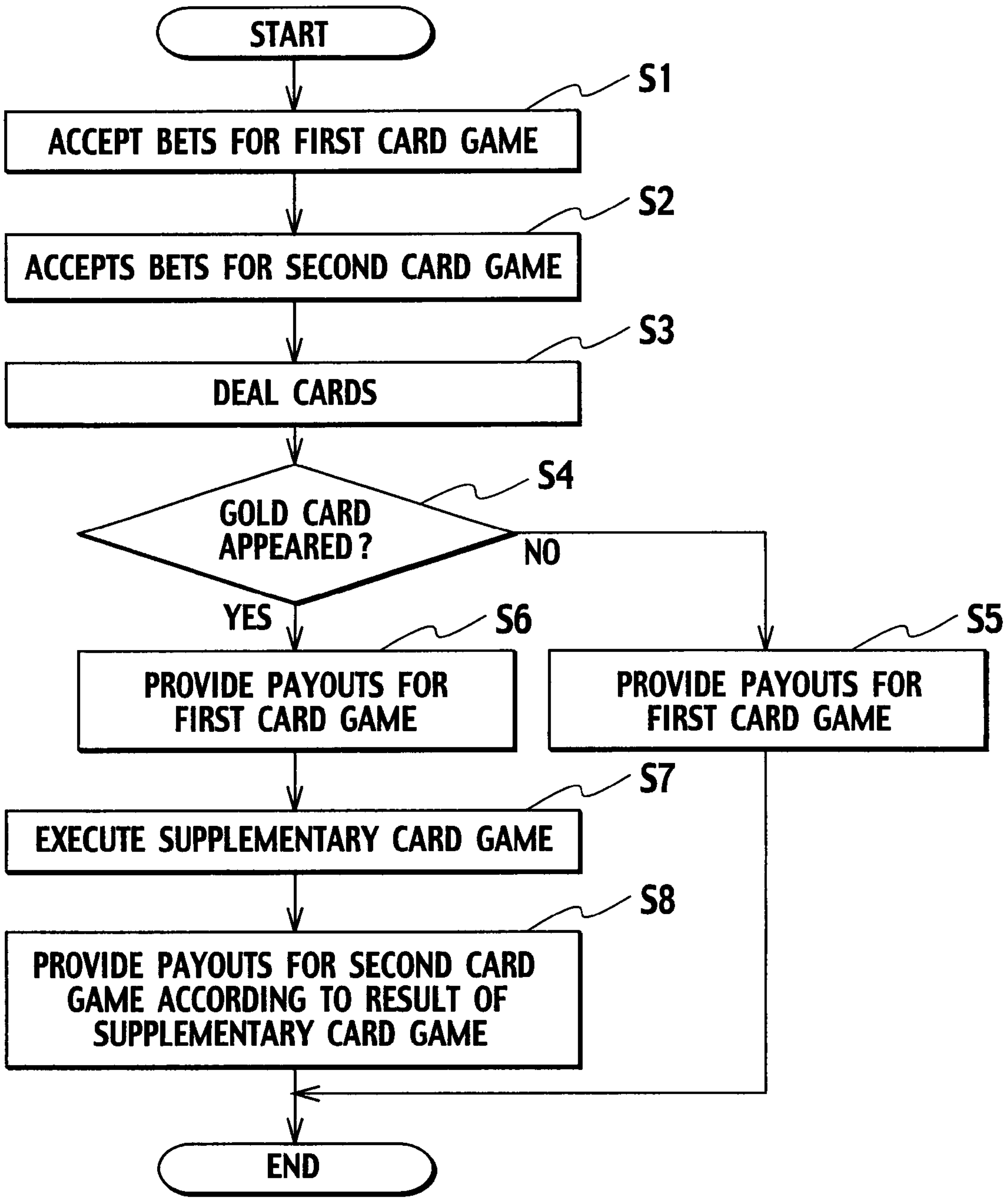
FIG. 1 is a flow chart showing a playing method of card games according to the first embodiment of the present invention.

As shown in FIG. 1, in the card games according to this embodiment, at the step S1, bets of the participants for the first game are accepted, and further at the step S2, bets of the participants for the second game are accepted.

Then, at the step S3, the cards for the first card game are dealt, and then at the step S4, whether a card in the second color (a gold card, for example) has appeared among the cards dealt at the step S3 described above or not is judged. In a case where the card in the second color has not appeared, a transition from the step S4 to the step S5 is made, and payouts (awards) of the first game are determined and these payouts (awards) are provided to the participants, and then the card games are finished.

In contrast, in a case where a card in the second color has appeared at the step S3, this implies that prizes regarding the second card game will be generated for those participants who made bets in the second card game. In this case, in the procedure of this card game, a transition from the step S4 to the step S6 is made, and payouts of the first card game are determined and these payouts are provided to the participants, and then at the step S7, a supplementary card game (a third card game) for determining sizes of the prizes is executed for those participants who are targets of the generation of the prizes regarding the second card game.

Then, at the step S8, the prizes (payouts or awards) of the sizes determined by the supplementary card game are provided to those participants how are targets of the generation (those participants who made bets in the second game) as the payouts of the second card game.

Figure 2:
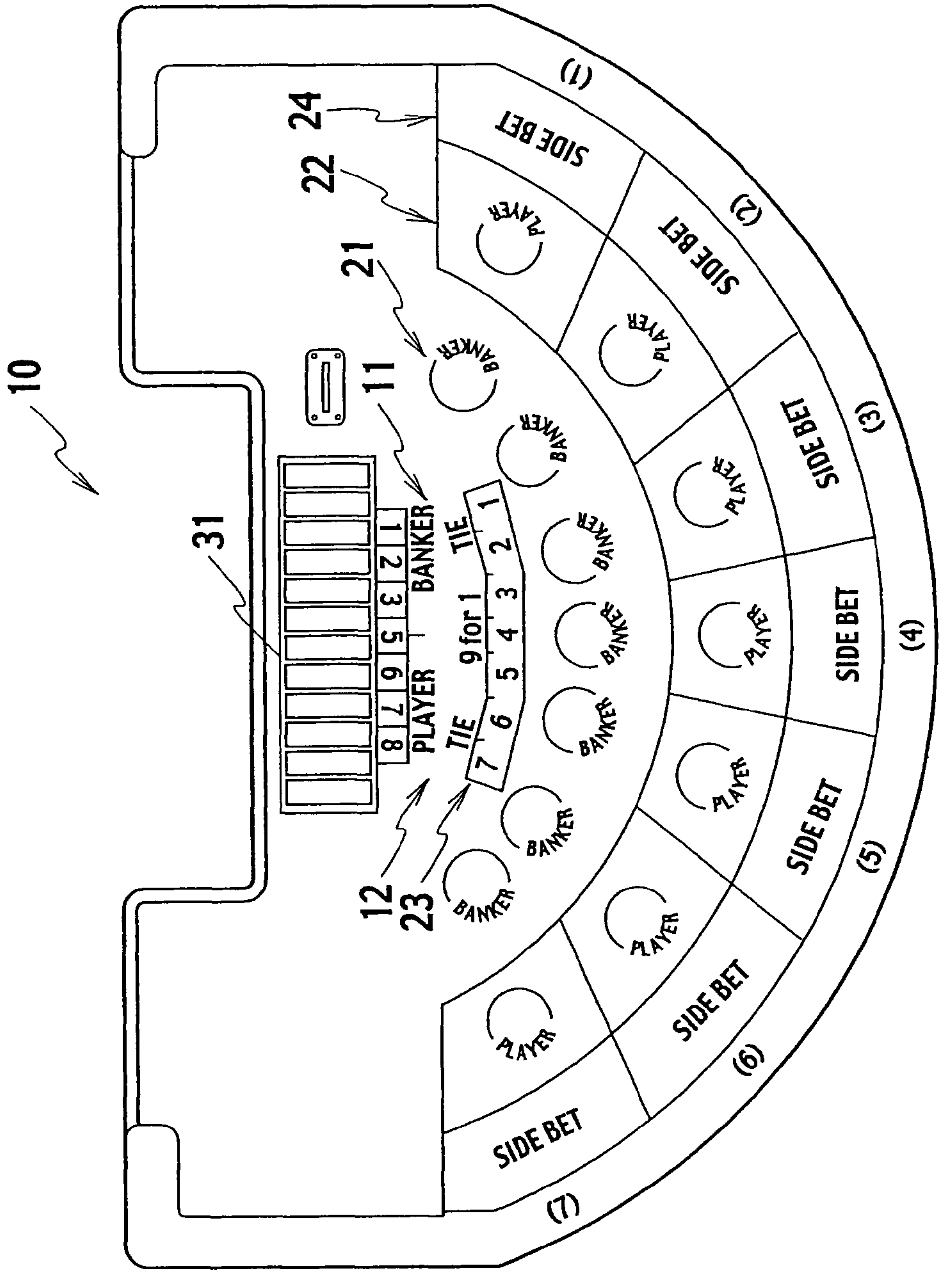
FIG. 2 is a plan view showing an upper face of a table on which card games according to the first embodiment of the present invention are to be executed.

As shown in FIG. 2, on an upper face of a table 10 on which the card games will proceed, a first area 11 and a second area 12 are provided. The first area 11 is an area in which cards for a Banker who is a target of bets by the participants will be dealt, and the second area 12 is an area in which cards of a Player who is a target of bets by the participants will be dealt.

In the baccarat game which is the first card game, two cards are dealt in each of the first area 11 and the second area 12 (there are cases where a third card is also dealt according to need), and a Banker's win, a Player's win, or a tie is determined according to contents of these two cards. These series of game proceedings are handled by a dealer.

Also, on an upper face of the table 10, spaces 21, 22 and 23 for the participants of the baccarat game to bet chips for that baccarat game are provided. The space 21 is a space for betting on the Banker's win, the space 22 is a space for betting on the Player's win, and the space 23 is a space for betting on the tie. Note that, in the case of this embodiment, each of the space 21 for betting on the Banker's win, the space 22 for betting on the Player's win, and the space 23 for betting on the tie is provided in seven sets, so that the up to seven participants can participate at one table 10. On the table 10, numbers (1 to 7) to be assigned to the participants are attached.

The participants can make bets on any one of the Banker's win, the Player's win and the tie by betting chips in the space for making bets for the first card game, before the cards are dealt in the first area 11 and the second area 12.

Also, on the table 10, a space 24 (which will be referred to as a side bet space in the following) for making bets for the second game (which will be referred to as side bets in the following) is provided, besides the spaces 21, 22 and 23 for making bets for the first card game (baccarat game). This space 24 is also provided in a number of sets corresponding to the number of participants, similarly as the other spaces 21, 22 and 23. The participants can optionally make bets for the second card game, at a time of making bets for the first card game (baccarat game). This space 24 is also used as a space in which cards for the supplementary card game (a card game associated with the second card game) for determining sizes of prizes for those participants who made bets for the second card game, in a case where the generation of prizes in the second card game is determined.

Also, on the table 10, a chip tray 31 or the like for accumulating chips is provided. In this chip tray 31, a prescribed number of chips are provided by the dealer before the start of the games, and in a case where a payout is to be given to a participant, the payout will be given from the chips provided in this chip tray 31, and in a case where a participant has lost a bet, the bet chips will be collected to the chip tray 31.

Next, the content of the baccarat game which is the first card game will be described in detail. In the baccarat game, the participant bets chips on any one of the Banker's win (BANKER), the Player's win (PLAYER) and the tie (TIE).

Then, the dealer deals two cards each in an order of the Player and the Banker. At a timing when the two cards each are dealt, if the lower one digit of a total of the English numerals (ranks) given on the two cards is 9 or 8 for either one of the Banker or the Player, that side will win. Note that, at a time of calculating a total of two cards, it is calculated by regarding Ace (A) as 1, each of 2 to 10 as the same number as the number on that card, and each of picture cards (Jack (J), Queen (Q) and King (K)) as 10.

Also, in a case where there is no win or lose at a time when two cards each are dealt to the Banker and the Player, whether it should draw (hit) a third card or it should stand (not draw) is determined according to a respective prescribed rule, for each of the Player and the Banker. This rule is different for the Player and the Banker.

Namely, as a rule on the Player side, a third card will be dealt to the Player if a lower one digit of a total of the two cards first dealt to the Player is any one of 0 to 5, unless the Banker is natural (that is, when a lower one digit of a total of the two cards first dealt is either 8 or 9).

Also, a third card will not be dealt to the Player if a lower one digit of a total of the two cards first dealt to the Player is either 6 or 7.

In addition, if the Player is natural, a third card will not be dealt to both the Player and the Banker.

On the other hand, as a rule on the Banker side, a third card will be dealt to the Banker if a lower one digit of a total of the two cards first dealt to the Banker is any one of 0, 1 and 2, unless the Player is natural.

Also, when a lower one digit of a total of the two cards first dealt to the Banker is 3, a third card will not be dealt to the Banker if a third card of the Player is 8, and a third card will be dealt to the Banker if a third card of the Player is anything other than 8.

Also, when a lower one digit of a total of the two cards first dealt to the Banker is 4, a third card will not be dealt to the Banker if a third card of the Player is anything other than 2, 3, 4, 5, 6 and 7, and a third card will be dealt to the Banker if a third card of the Player is any one of 2, 3, 4, 5, 6 and 7.

Also, when a lower one digit of a total of the two cards first dealt to the Banker is 5, a third card will not be dealt to the Banker if a third card of the Player is anything other than 4, 5, 6 and 7, and a third card will be dealt to the Banker if a third card of the Player is any one of 4, 5, 6 and 7.

Also, when a lower one digit of a total of the two cards first dealt to the Banker is 6, a third card will not be dealt to the Banker if a third card of the Player is anything other than 6 and 7, and a third card will be dealt to the Banker if a third card of the Player is either one of 6 and 7.

Also, when a lower one digit of a total of the two cards first dealt to the Banker is 7, a third card will not be dealt to the Banker.

Also, when a lower one digit of a total of the two cards first dealt to the Banker is 8 or 9 (natural), a third card will not be dealt to both the Banker and the Player.

The game will be made to proceed by the dealer according to such rules, and when the game is over, a result of any one of the Banker's win, the Player's win and the tie is judged. In this judgment, a total of numbers on the cards dealt to the Banker and a total of numbers on the cards dealt to the Player are calculated, and one with its lower one digit closer to 9 will win. If the lower one digits are the same, it will be tie. Then, payouts according to this result of win or lose are calculated, and chips in numbers according to the payouts will be paid to those participants who obtained the payouts. In this case, the same amount as the bet will be paid as the payout for the bet on the Banker, and an amount eight times as much as that will be paid as the payout for the bet on the tie.

Next, the content of the second card game will be described in detail. In the second card game, the participants of the first card game (baccarat game) can participate in the second card game by placing (betting) chips on the space 24 for making the side bet.

In the second card game, the generation of a prize will be determined for those participants who made bets (side bets) in the second card game, in a case where there is a card (gold card) for which a color of a face showing a suit and a rank is the second color (a particular color such as gold, for example) among a plurality of cards dealt in the first area 11 and the second area 12 for the first card game.

Then, the supplementary card game for determining sizes of the prizes for those participants who become targets of the generation of the prizes of the second card game (those participants who made the side bets) will be executed. Namely, this supplementary card game is a card game associated with the second card game, in which one card for the supplementary card game is dealt in each space 24 for making the side bet of the each participant who made the bet in the second card game, and the size of the prize of that participant is determined according to the rank of that card. In the case of this embodiment, such a rule that the larger prizes will be generated in an ascending order of the ranks is adopted, but the present invention is not limited to this case, and it is possible to use various methods as the method for determining the size of the prize, such as on in which the largest prize will be allocated when a particular rank (such as Ace) has appeared, etc. It is also possible to determine the size of the prize according to a type of the suit or a combination of both the suit and the rank, without being limited to the method using the rank of the card.

When the size of the prize regarding the second card game is determined by the supplementary card game, the payout according to that size will be paid to the corresponding participant. Note that, in a case where the prize regarding the second card game is not generated (a case where a card in the second color (gold card) did not appear in the first card game), the chips bet as the side bet will be collected to the chip tray 31 on the dealer side. The chips to be used for the payouts of the second card game are chips provided in the chip tray 31 similarly as the chips of the first card game. In this way, in the case of this embodiment, the chips to be paid to the participants as the payouts in the second card game and the chips collected from the participants are collectively managed with the chips of the first card game, in the same chip tray 31 as the chips used in the first card game (baccarat game).

Note that the management of the chips in the second card game may be carried out separately from the chips of the first card game. In this case, the chip tray 31 will be used as that for the first card game, while a chip tray different from that is provided for the second card game, and the chips for the second card game will be managed in that chip tray, separately from the chips for the first card game. Namely, the chips to be paid to the participants in the second card game are chips provided in the chip tray for the second card game, and the chips collected from those participants who lost the bets in the second card game will be returned to that chip tray for the second card game.

Figure 3:
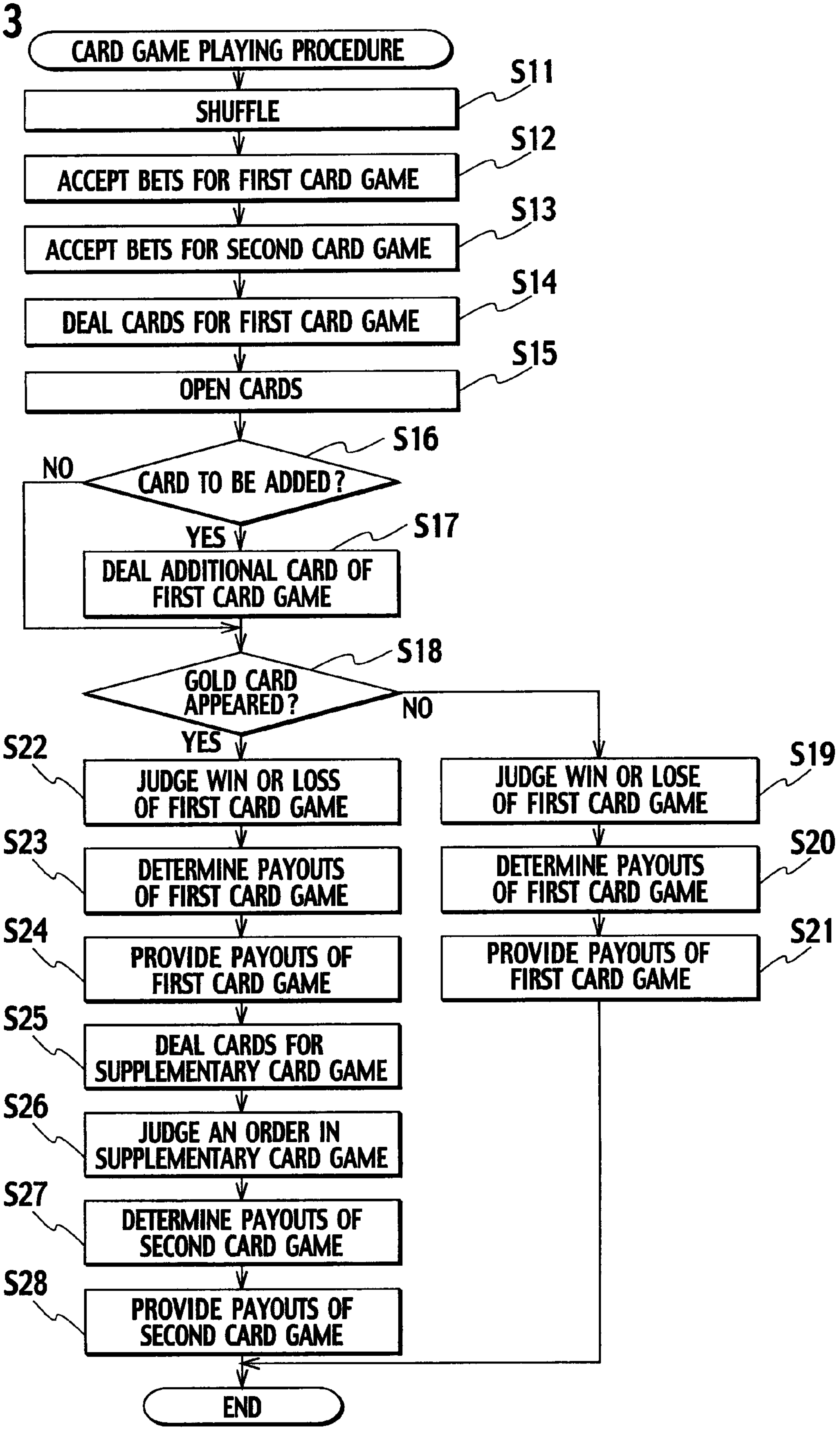
FIG. 3 is a flow chart showing a detail of a playing method of card games according to the first embodiment of the present invention.

Next, with references to the flow chart shown in FIG. 3 and the states of the table 10 shown in FIG. 4 to FIG. 7, a detail of the playing method of card games according to this embodiment will be described. FIG. 3 is a flow chart showing a procedure of the card games to be made to proceed by the dealer.

After the dealer shuffled one set or plural sets of trump cards (step S11), the bets for the first card game (baccarat game) are accepted (step S12). In the cards to be shuffled at the step S11, the cards for which a color of a face showing the suit and the rank is the first color (white), and the cards for which that color is the second color (a particular color, which is gold in the case of this embodiment) (which will be referred to as gold cards in the following) are mixed.

At the step S12, the participants bet chips on any one of the Banker's win, the Player's win, and the tie, by placing chips on any one of the spaces 21, 22 and 23 for betting regarding the first card game that are provided on the table 10.

Figure 4:
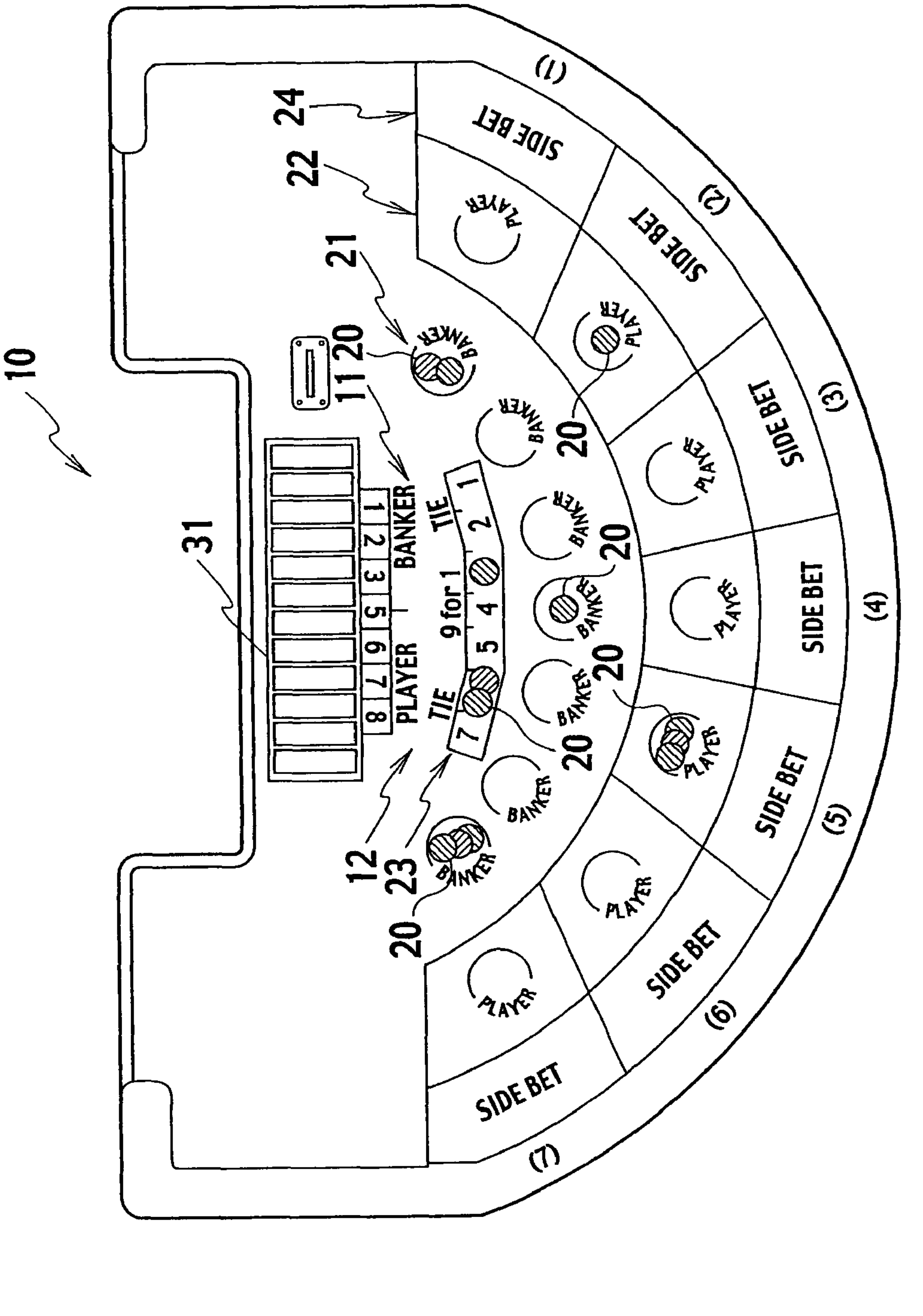
FIG. 4 is a plan view showing a state of a table on which bets for a first card game are made in the first embodiment of the present invention.

FIG. 4 shows a state in which the first participant bets two chips 20 on the Banker's win, the second participant bets one chip 20 on the Player's win, the third participant bets one chip 20 on the tie, the fourth participant bets one chip 20 on the Banker's win, the fifth participant bets three chips 20 on the Player's win, the sixth participant bets two chips 20 on the tie, and the seventh participant bets three chips 20 on the Banker's win.

In addition, the bets for the second card game are accepted (step S13). Namely, the participant can participate in the second card game by placing chips in the space 24 for the side bet that is provided on the table 10 (by making the side bet). The side bet is optionally made by the participant.

Figure 5:
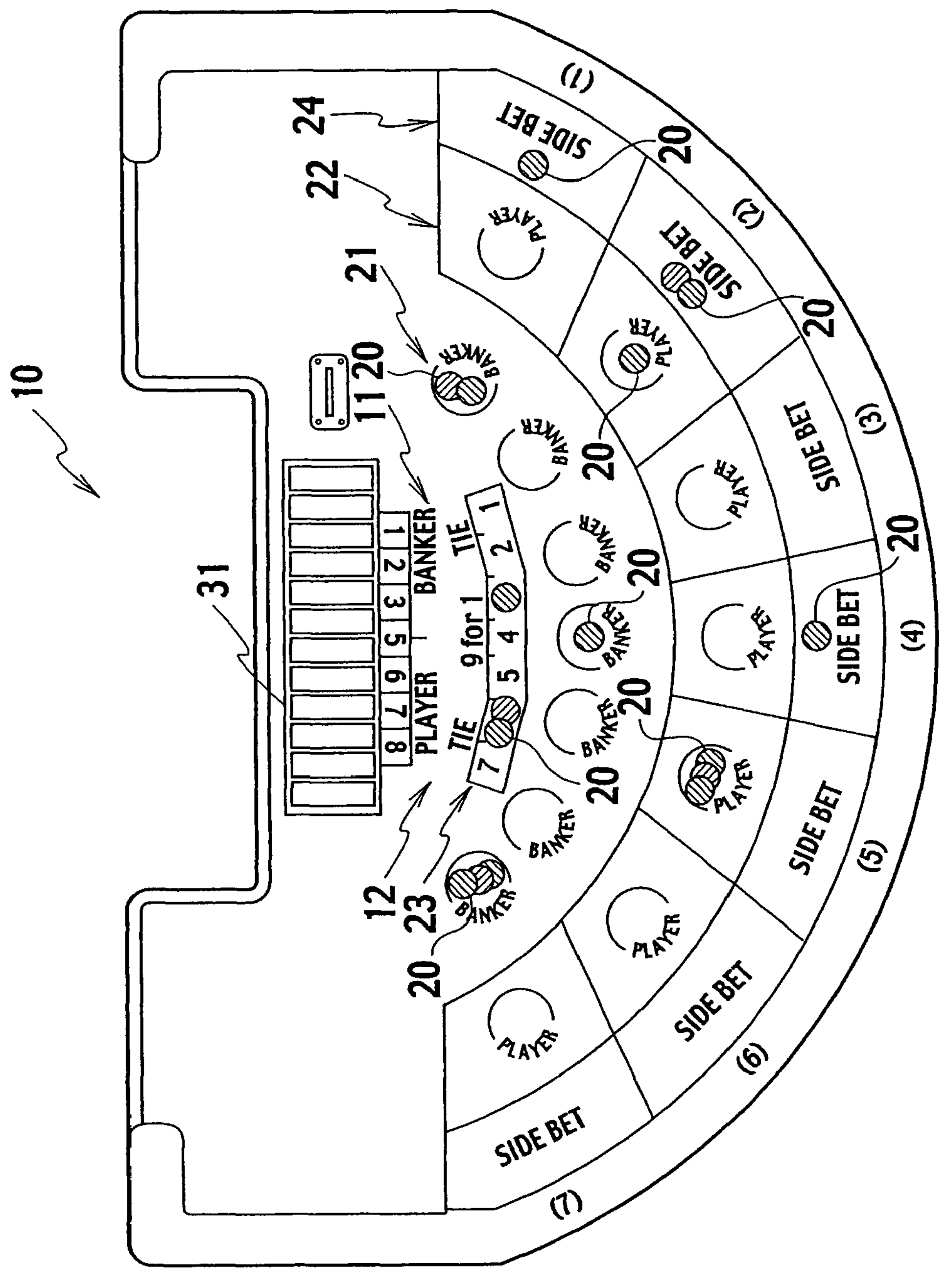
FIG. 5 is a plan view showing a state of a table on which bets for a second card game are made in the first embodiment of the present invention.

FIG. 5 shows a state in which the first participant made the side bet by placing one chip 20 in the space 24 for the side bet, the second participant made the side bet by placing two chips 20 in the space 24 for the side bet, and the fourth participant made the side bet by placing one chip in the space 24 for the side bet, from the state shown in FIG. 4. In this case, the third, fifth, sixth and seventh participants did not make the side bets by not placing any chips in their own spaces 24 for the side bet.

Figure 6:
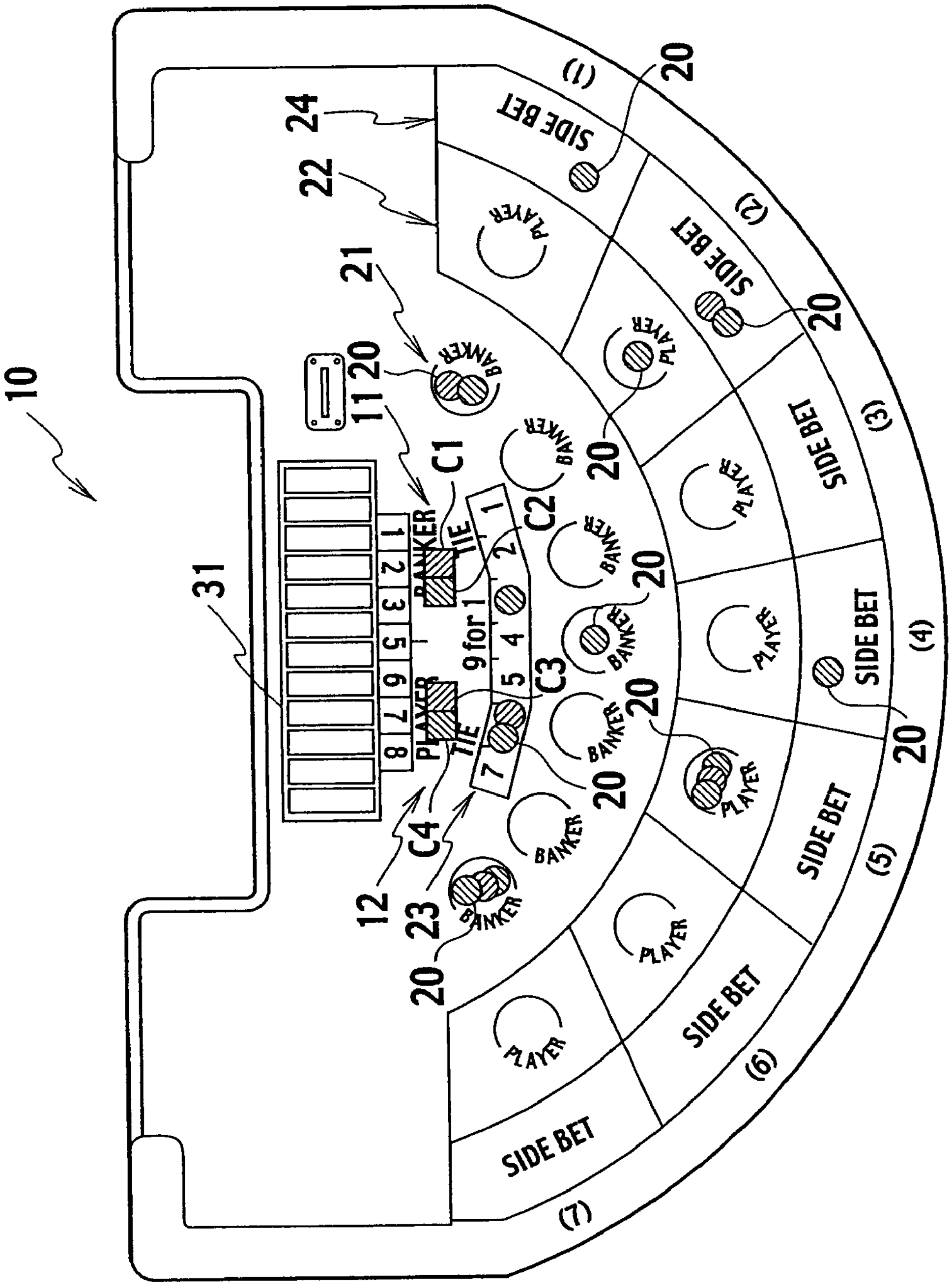
FIG. 6 is a plan view showing a state in which cards for a first card game are dealt and laid face down in the first embodiment of the present invention.

When the bets for the first card game and the bets for the second card game are made, the cards for the first game are dealt by the dealer. Namely, as shown in FIG. 6, two cards C1 and C2 and two cards C3 and C4 are dealt in the first area 11 and the second area 12 respectively, in the state of being laid face down (step S14).

Then, the cards for the first game dealt in the first area 11 and the second area 12 are opened by the dealer (step S15). Note that, as described above, in the baccarat game, there are cases where a third card is also dealt to at least one of the Banker and the Player, according to contents of the two cards first dealt to each of the Banker and the Player. In this case, whether an additional card is necessary or not is determined according to the rules of the baccarat game (step S16), and if it is necessary, an additional card is dealt (step S17).

In the state where the cards dealt in the first area 11 and the second area 12 are opened in this way, whether the gold card has appeared among them or not is judged (step S18). In a case where the gold card has not appeared, the win or lose (or the tie) among the Banker and the Player in the first card game (baccarat game) is judged according to the four cards opened in the first area 11 and the second area 12 (if the additional card is dealt according to the game rules of the first card game (baccarat game), that additional card is also included) (step S19), and the payouts of the first card game are determined according to a result of that judgment (step S20). Then, the determined payouts are paid to the corresponding participants (i.e. the first bets are settled) (step S21).

In contrast, in a case where the gold card is included among the cards for the first card game that are opened in the first area 11 and the second area 12, this implies that the generation of the prizes for those participants who made bets in the second card game will be determined, so that after the processing (the processing regarding the first card game) for the judgment of the win or lose (or the tie) of the first card game (step S22), the determination of the payouts of the first card game (step S23), and the payment of the payouts of the first card game (step S24) are carried out, the supplementary card game (a card game associated with the second card game) for determining sizes of the prizes regarding the second card game is executed.

Figure 7:
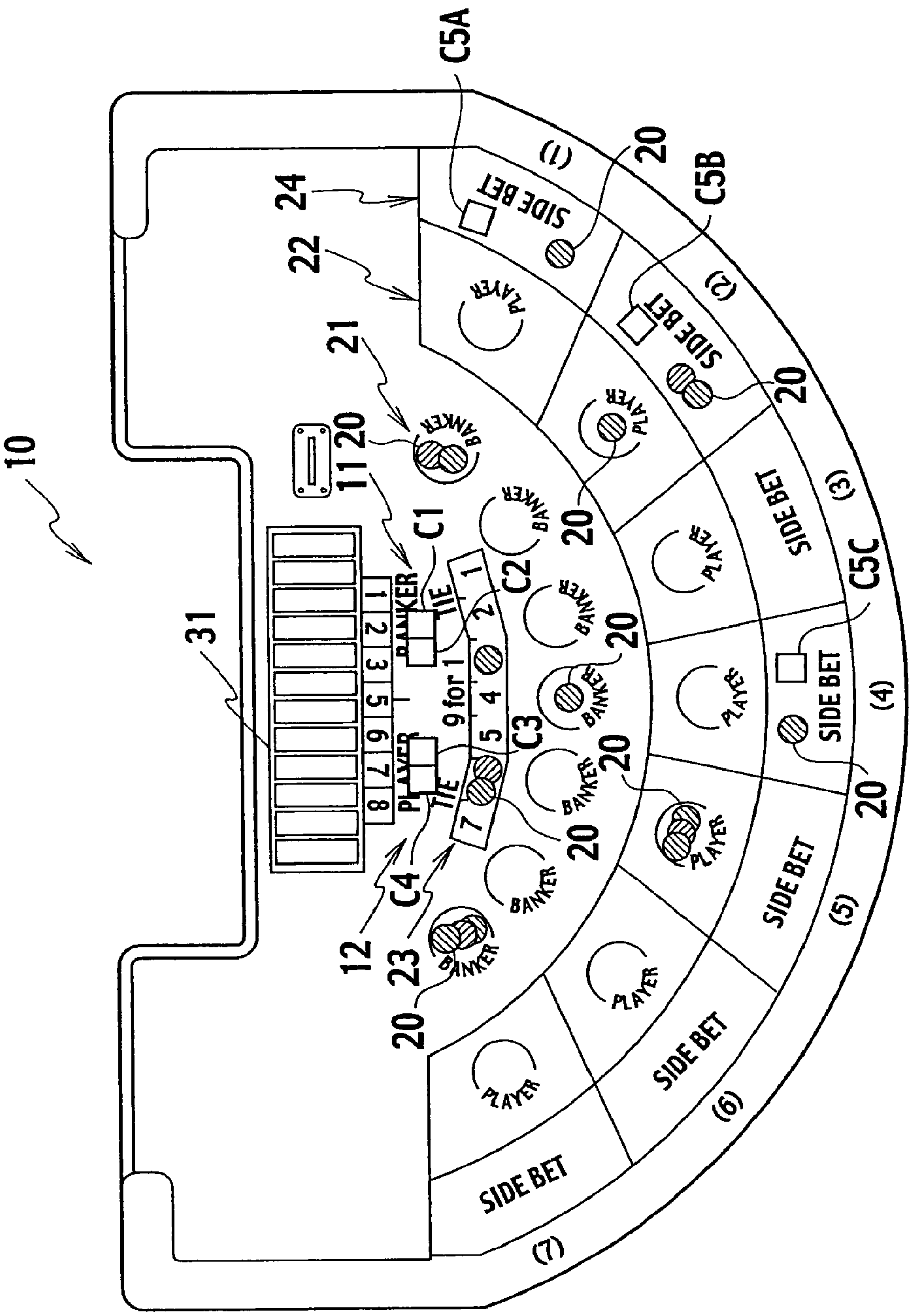
FIG. 7 is a plan view showing a state in which cards for a first card game are opened and cards for a supplementary card game are dealt in the first embodiment of the present invention.

Namely, as shown in FIG. 7, one card for the supplementary card game is dealt to each of the participants who made the bet (side bet) in the second card game in a state of being opened (step S25). For example, as shown in FIG. 7, the card is dealt in the spaces in which chips are placed among the spaces 24 for the side bet. In the case of FIG. 7, because the first participant, the second participant and the fourth participant made the side bets, so that the cards C5A, C5B and C5C are dealt respectively in the spaces corresponding to these participants, one card for each space.

Then, the order of the cards C5A, C5B and C5C for the supplementary card game is judged (step S26). In this case, for example, the order is determined as a descending order of the ranks of the cards dealt for the supplementary card game. Note that the method for determining is not limited to the descending order of the ranks, and it may be determined by combining a type of the suit, etc.

When the order of the supplementary card game is determined, the payouts regarding the second card game for those participants who made the side bets are determined according to that order (step S27). As a method for determining the payouts, there is a method in which rates for bet chips are determined in advance according to the order, for example. In this case, for example, a payout of three times chips bet by the participant is determined for the participant who became the first place in the supplementary card game, a payout of two times chips bet by the participant is determined for the participant who became the second place, and a payout of one times chips bet by the participant is determined for the participants who became the third or lower places. Note that these payouts are to be paid to the participants in addition to the bet chips.

Then, the payouts regarding the second card game determined at the step S27 are paid to the corresponding participants (step S28).

As a method for determining the payouts at the step S27, it is possible to adopt other methods such as that in which the payout rate (a rate for bet chips) is changed according to the number of the participants who made bets for the second card game, for example, without being limited to the method described above.

In the above description, the size of the prize is determined according to a result of the supplementary card game in a case where the generation of the prize is determined in the second card game, but the present invention is not limited to this, and it may be made such that a payout determined in advance is paid to the corresponding participants in a case where it is judged that the gold card has appeared at the step S18, without carrying out the supplementary card game of the step S25 and the step S26.

As described above, in the baccarat game which is the first card game, at least two cards for the Banker are dealt in the first area 11 which is a common field for a plurality of participants, and at least two cards for the Player are dealt in the second area 12 which is a common field for a plurality of participants, and in a case where a card for which a color of a front face of a card is a particular color (gold, for example) is included among these cards, a generation of a prize in the second card game is determined. By this determination, the participants who made bets in the second card game can obtain rights for acquiring prizes. Then, the supplementary card game for determining sizes of these prizes is executed, and the payouts for the participants are determined.

For this reason, every time the first card game is carried out once, a participant can make a second bet for the second card game as an option, along with a first bet for the first card game, and in the second card game, a prize of the second card game is generated according to a color of a face of a card disclosed in the first card game. In this way, it becomes possible for a participant to make a plurality of bets for mutually different first and second card games during one play of the card game.

Also, as the generation of the prize of the second card game is determined in a case where a color of a face of a card for the first card game is a particular color, when the first card game is executed, the second card game will be executed in conjunction with this. In this way, at a time of executing the second card game of a type different from the first card game, a procedure for the first card game that deals cards can also be utilized as a game procedure of the second card game, and an opportunity to participate in the second card game is given to the participant without changing the procedure of one play of the card game. Hence, it is possible to give an opportunity to make a plurality of bets for a plurality of card games easily, to the participant.

Also, as the generation of the prize of the second card game is determined in a case where a color of a face of a card for the first card game is a particular color, the generation of the prize of the second card game can be conveyed to the participant in an easily comprehensible state, while executing the first card game.

Second Embodiment

A gaming machine 100 according to the second embodiment of the present invention will be described with references to FIG. 8 to FIG. 22. Among these figures, FIG. 8 is a schematic diagram showing features of card games to be executed at the gaming machine according to the second embodiment of the present invention, and FIG. 13, FIG. 18 and FIG. 20 to FIG. 22 are front views showing images to be displayed on a common display 101 according to the second embodiment of the present invention.

The card games to be executed at the gaming machine 100 according to this embodiment are similar to the card games described above for FIG. 1, in which the baccarat game is set as the first card game, and the supplementary card game is executed during that one play of the game such that the participants are given an opportunity to bet for the second card game during one play of the first card game. In this embodiment, as the second card game, a game in which a generation of a prize of the second card game is determined in a case where a color of an image of a card front face to be displayed with the suit and the rank superposed thereon is displayed as changed to a particular color (second color), among images of a plurality of cards shown on a display for the first card game, will be executed. The participants are given an opportunity to bet for each of the first card game and the second card game. In this way, the participants are given an opportunity to bet for plural types of games, during one play of the game.

Figure 8:
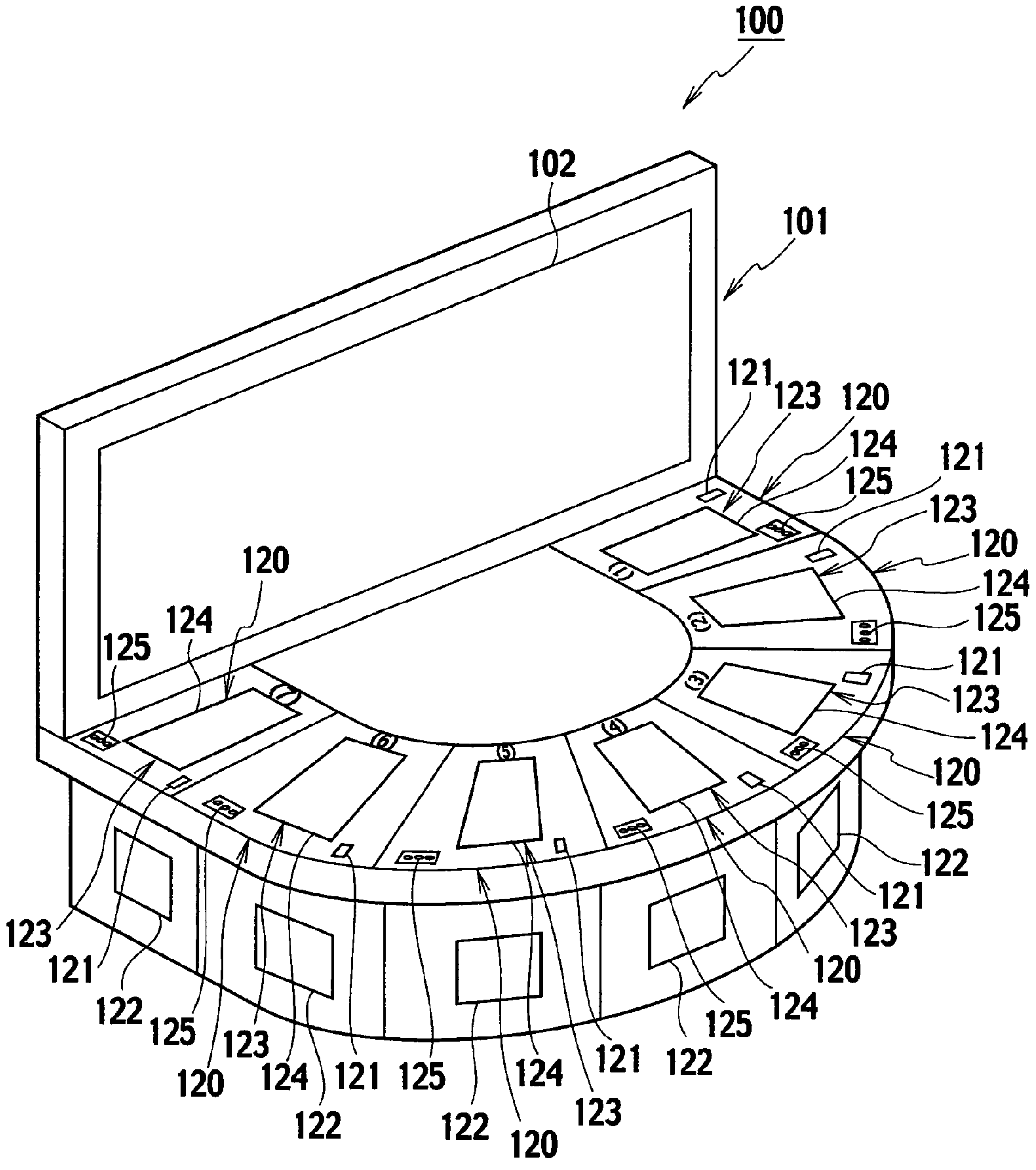
FIG. 8 is a perspective view showing an outward appearance of a gaming machine according to the second embodiment of the present invention.

As shown in FIG. 8, the gaming machine 100 has a common display (first display) 101, and a plurality of gaming terminals 120 (120A to 120G).

The common display 101 is provided commonly with respect to the plurality of gaming terminals 120, and the first card game, the second card game, and the supplementary card game associated with that second card game to be executed by a controller 150 (described below) provided inside the gaming machine 100 will be displayed. In this embodiment, the baccarat game is executed as the first card game. This common display 101 is formed by a liquid crystal display device, for example.

The gaming terminals 120 are arranged to surround the common display 101, on a display screen 102 side of the common display 101. On each gaming terminal 120, a chip insertion slot 121, a chip payout opening 122, a terminal display (second display) 123, and a switch unit 125. The chip insertion slot 121 is an insertion slot from which a participant who uses the gaming terminal 120 will insert chips as bets for the first card game and the supplementary card game. The chip payout opening 122 is a payout opening for paying a payout of the game to the gaming terminal 120 (participant). The switch unit 125 is an operation unit on which the participant makes various types of inputs for participating in the game.

Also, on the terminal display 123, an image for the participant to participate in the first card game that is to proceed on the common display 101 such as a screen for accepting a bet for the first card game, a calculation result of a payout according to a game result of the first card game, etc. will be displayed by a control of the controller 150. This image is an individual image for each gaming terminal 120. In the case of this embodiment, the terminal display 123 is formed by a liquid crystal display device.

Also, on the terminal display 123, an image showing a proceeding state of the second card game and the supplementary card game, and an image for the participant to participate in the second card game will be displayed. These images are individual images for each gaming terminal 120. On a surface of the terminal display 123, a touch panel 124 is provided, and an input operation unit is formed by this touch panel 124. In the gaming terminal 120, the bets and the like for the first card game and the second card game will be accepted through this input operation unit.

In the case of the gaming machine 100 of this embodiment, seven gaming terminals 120 are provided. Each gaming terminal 120 is for one participant to participate in the first card game and the supplementary card game, such that seven participants can participate in the first card game and the supplementary card game together at the gaming machine as a whole.

Figure 9:
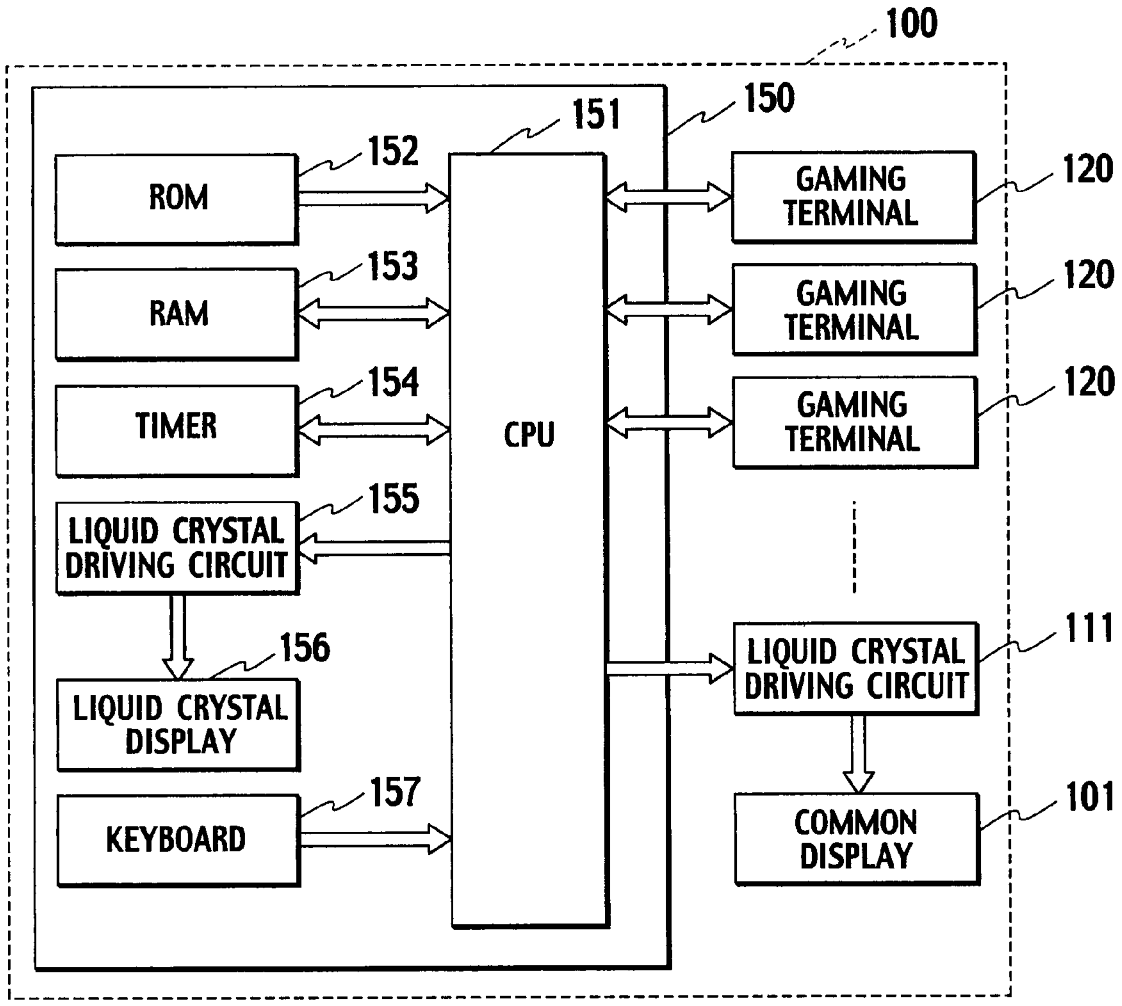
FIG. 9 is a block diagram showing a configuration of a gaming machine according to the second embodiment of the present invention.

As shown in FIG. 9, the controller 150 of the gaming machine 100 has a CPU (central processing unit) 151, a ROM 152, a RAM 153, a timer 154, a liquid crystal display 156, and a keyboard 157. The CPU 151 carries out an overall control of the controller 150. The liquid crystal display 156 is connected to the CPU 151 through a liquid crystal driving circuit 155. The CPU 151 displays information related to the maintenance of the gaming machine 100 and information related to updates and the like of various types of programs on the liquid crystal display 156. Also, the CPU 151 executes a processing for maintaining and managing the gaming machine 100, according to commands related to the maintenance and commands related to updates and the like of various types of programs inputted through the keyboard 157.

The liquid crystal driving circuit 155 has a program ROM, an image ROM, an image control CPU, a work RAM, a VDP (video display processor), and a video RAM. In the program ROM, an image control program and various types of selection tables related to displays at the common display 101 are stored. In the image ROM, dot data for forming images to be displayed at the common display 101 are stored, for example. The image control CPU makes a determination of an image to be display on the common display 101 from the dot data stored in advance in the image ROM, according to the image control program stored in advance in the program ROM, based on parameters set by the CPU 151. The work RAM is formed as a temporary memory device at a time of executing the image control program at the image control CPU. The VDP forms an image according to a display content determined by the image control CPU, and outputs it to the common display 101. The video RAM is formed as a temporary memory device at a time of forming an image at the VDP.

With this configuration, the liquid crystal driving circuit 155 makes the common display 101 to display indications of the suit and the rank in a state of being superposed on an image of a card front face, as an image of a card for the first card game. The liquid crystal driving circuit 155 displays either a first color (white, for example) or a second color (gold, for example) as a color of a front face for each image of a card, in a case of displaying an image of a card front face on the common display 101. This color of an image of a card front face is determined by a control of the CPU 151.

The CPU 151 carries out various types of processing according to signals supplied from the gaming terminals 120 and the data and programs stored in the ROM 152 and the RAM 153, and transmits control data to the gaming terminals 120 according to a result of that processing. In this way, the CPU 151 controls each gaming terminal 120. Also, the CPU 151 executes the first card game (baccarat game), the second card game and the supplementary card game, according to programs stored in the ROM 152. To the CPU 151, the common display 101 formed by a liquid crystal display is connected through a liquid crystal driving circuit 111. The CPU 151 displays the proceeding state of the first card game, the second card game and the supplementary card game on the common display 101, and transmits information associated with the proceeding state of the supplementary card game to the gaming terminals 120. At the gaming terminal 120, the information received from the controller 150 is displayed on the terminal display 123.

The ROM 152 is formed by a semiconductor memory or the like, for example. In this ROM 152, programs for executing the first card game, the second card game and the supplementary card game, payout rates (amounts of credits to be paid for a bet of one chip) in the first card game and the second card game, programs for controlling the gaming terminals 120, etc. are stored.

On the other hand, the RAM 153 stores chip bet information supplied from the gaming terminals 120, game results at the gaming terminals 120, information on prizes (amounts of credits paid) generated according to the game results, amounts of credits (amounts of credits owned by the participants) of the gaming terminals 120, and data related to a result of a processing executed by the CPU 151, etc. When the chips are inserted at each gaming terminal 120, the controller 150 receives information indicating the inserted amount from the gaming terminal 120, and increases the amount of credits for that gaming terminal 120 that is stored in the RAM 153 as much as this inserted amount. Also, when the bet information is receiving from each gaming terminal 120, the controller 150 stores this bet information into the RAM 153 in correspondence to the gaming terminal 120 that is its source, and subtracts the amount of credits for that gaming terminal 120 as much as the amount of bet indicated by the bet information.

The bet information is information indicating contents bet at the each terminal 120 for the first card game and the supplementary card game, which is information in which any one of the Banker's win, the Player's win and the tie and the amount of chips bet are set in correspondence in a case where the baccarat game is to be executed as the first card game, and information in which information indicating the participation in the second card game and the amount of chips bet are set in correspondence. The bet information will be stored in correspondence to information indicating the gaming terminal at which the bet is made.

Also, the controller 150 stores a game result of the first card game, and game results of the second card game and the supplementary card game into the RAM 153, and calculates a payout for each gaming terminal 120 according to these game results and the bet information obtained from each gaming terminal 120, stores that payout into the RAM 153, and updates the amount of credits owned by each gaming terminal 120 that is stored in the RAM 153 according to that payout. Also, when a credit payout request is received from each gaming terminal 120, the controller 150 transmits a credit payout command to that gaming terminal 120 according to the amount of credits stored in the RAM 153 in correspondence to each gaming terminal 120, and rewrites the amount of credits of that gaming terminal that is stored in the RAM 153 to "0".

Figure 10:
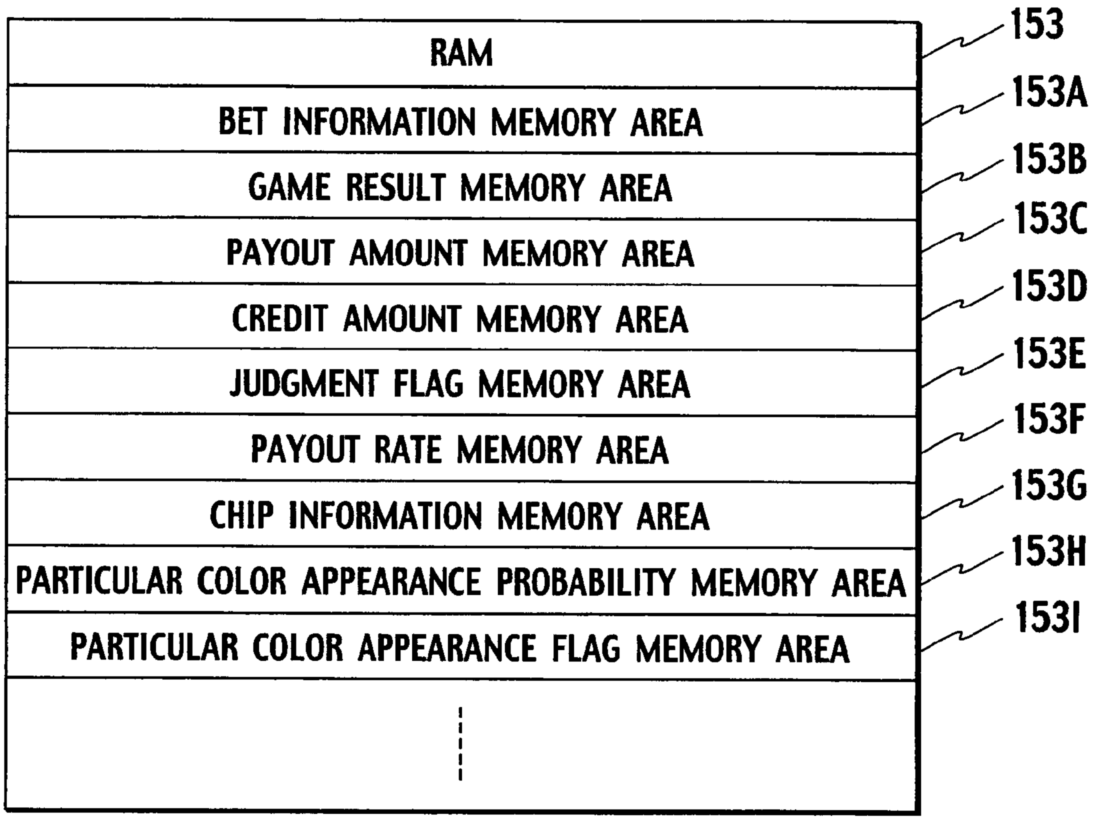
FIG. 10 is a schematic diagram showing data to be stored in a RAM of a controller of the gaming machine of FIG. 8.

FIG. 10 is a schematic diagram showing a memory region of the RAM 153 of the controller 150 according to this embodiment. As shown in FIG. 10, in the RAM 153, a bet information memory area 153A, a game result memory area 153B, a payout amount memory area 153C, a credit amount memory area 153D, a judgment flag memory area 153E, a payout rate memory area 153F, a chip information memory area 153G, a particular color appearance probability memory area 153H, and a particular color appearance flag memory area 153I are provided. In the bet information memory area 153A, the bet information received from each gaming terminal 120 is stored. More specifically, the betting contents of each gaming terminal 120 for the first card game and the second card game are stored in the bet information memory area 153A. In the game result memory area 153B, the game result in the first card game (any one of the Banker's win, the Player's win and the tie), the game result in the second card game (Whether the gold card has appeared in any of images of a plurality of cards displayed for the first card game or not), and the game result in the supplementary card game (a result of the game for determining sizes of the prizes (payouts) for the participants who made bets in the second card game) are stored, for a prescribed number of past plays of the games.

The gold card implies an image of a card for the first card game displayed on the common display 101, which is an image of a card for which a color of an image of a card front face to be displayed with the suit and the rank superposed thereon is displayed as changed to the second color (gold in the case of this embodiment). In the case of this embodiment, the second color is set as gold, but the present invention is not limited to this, and it is possible to adopt other various colors different from the first color (white, for example).

In FIG. 10, in the payout amount memory area 153C, payouts for each gaming terminal 120 in one play of the first card game and the second card game executed at that point are recorded, for a prescribed number of past plays. In the credit amount memory area 153D, the amount of payout owned by each gaming terminal 120 (each participant) is stored. In the judgment flag memory area 153E, flags indicating whether the judgment of the game result has been finished or not for each of the first card game, the second card game and the supplementary card game are stored. In the payout rate memory area 153F, a payout rate regarding the first card game according to the game rules of the first card game (baccarat game) and a payout rate (described below) in the second card game according to a result of the supplementary card game are stored.

In the chip information memory area 153G, the amount of chips possessed by the gaming machine 100 is stored. This amount of chips is such that, when the chip information is received from each gaming terminal 120, that part will be added, and when a payout is to be given to each gaming terminal 120, that part will be subtracted. In this embodiment, the chips in the first card game and the second card game are managed by the same chip information. Namely, the amount of chips bet in the first card game and the amount of chips bet in the supplementary card game are added to the same chip information, and the payout paid to the gaming terminal 120 in the first card game and the payout paid to the gaming terminal 120 in the supplementary card game are subtracted from the same chip information.

This chip information may be managed as separate information for the first card game and the second card game. Namely, it may be made such that, when the chips are bet in the first card game and when the payout is paid to the gaming terminal 120 in the first card game, the chip information for the first card game will be added and subtracted, whereas when the chips are bet in the second card game and when the payout is paid to the gaming terminal 120 in the second card game, the chip information for the second card game will be added and subtracted.

In the particular color appearance probability memory area 153H, a probability for which the second color (gold in the case of this embodiment) is selected as a color of an image of a card front face displayed on the common display 101 is stored. Also, in the particular color appearance flag memory area 153I, a result of randomly selecting whether or not to make the particular color appear in the second card game is stored.

In the controller 150 (FIG. 9), to the CPU 151, the timer 154 for carrying out a time measurement is connected. A time information of the timer 154 is transmitted to the CPU 151, and the CPU 151 controls the proceedings of the first card game, the second card game and the supplementary card game according to this time information.

Figure 11:
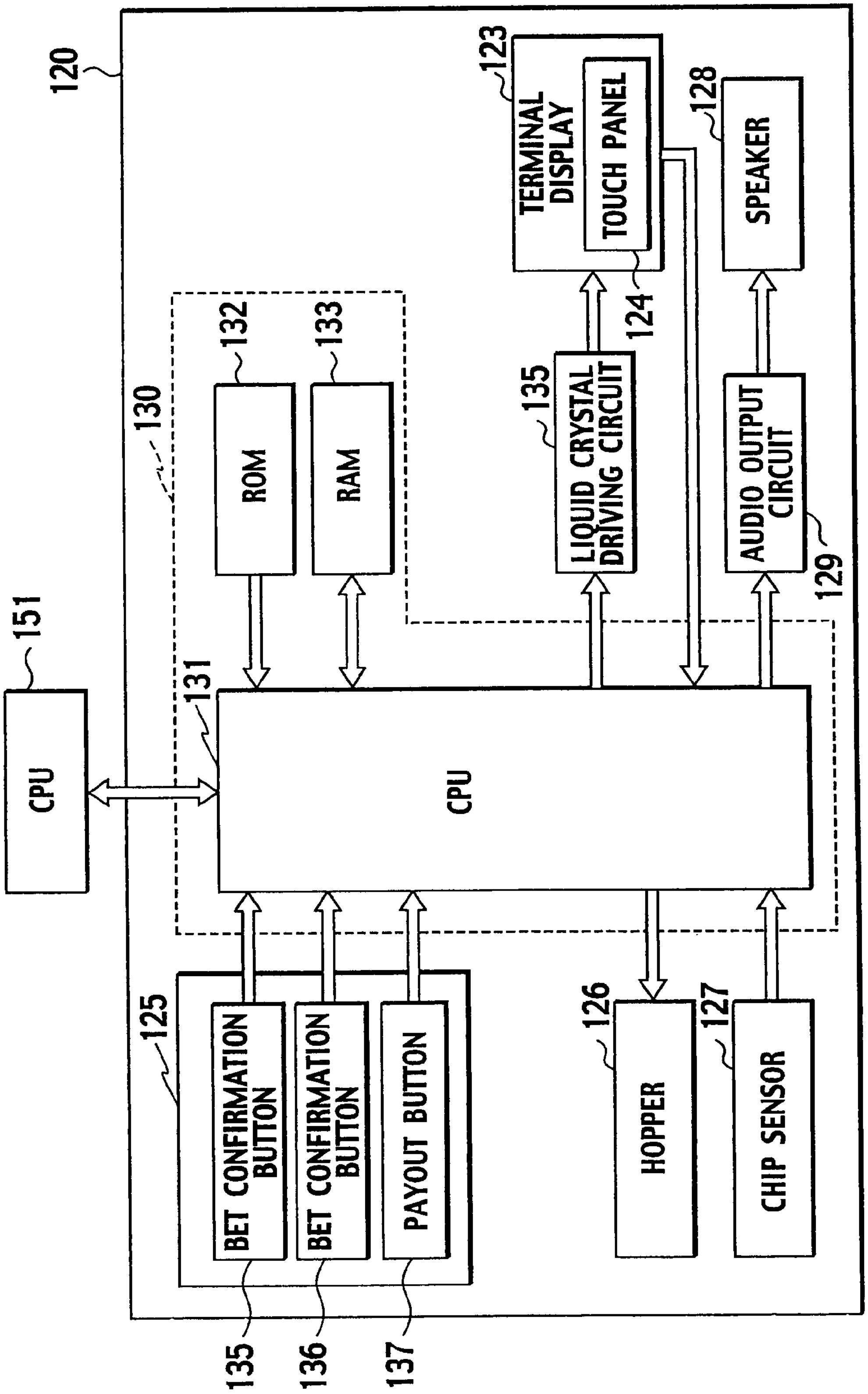
FIG. 11 is a block diagram showing a configuration of a gaming terminal of the gaming machine of FIG. 8.

FIG. 11 is a block diagram showing an internal configuration of the gaming terminal 120 according to this embodiment. The gaming terminals 120 provided in a plurality of sets have basically the same configuration, so that one gaming terminal 120 will be described here.

As shown in FIG. 11, the gaming terminal 120 has a terminal controller 130, a switch unit 125, a terminal display 123, a hopper 126, a chip sensor 127 and a speaker 128. The terminal controller 130 has a CPU 131, a ROM 132, and a RAM 133. The ROM 132 is formed by a semiconductor memory or the like, for example, and stores programs for realizing basic functions of the gaming terminal 120, various types of programs and data tables necessary in controlling other gaming terminals 120, etc. The RAM 133 is a memory for temporarily storing game results of the first card game and the supplementary card game transmitted from the controller 150, various types of data calculated by the CPU 131, the amount of credits possessed by the gaming terminal 120, a result of betting at the gaming terminal 120 (the bet information), etc.

Figure 12:
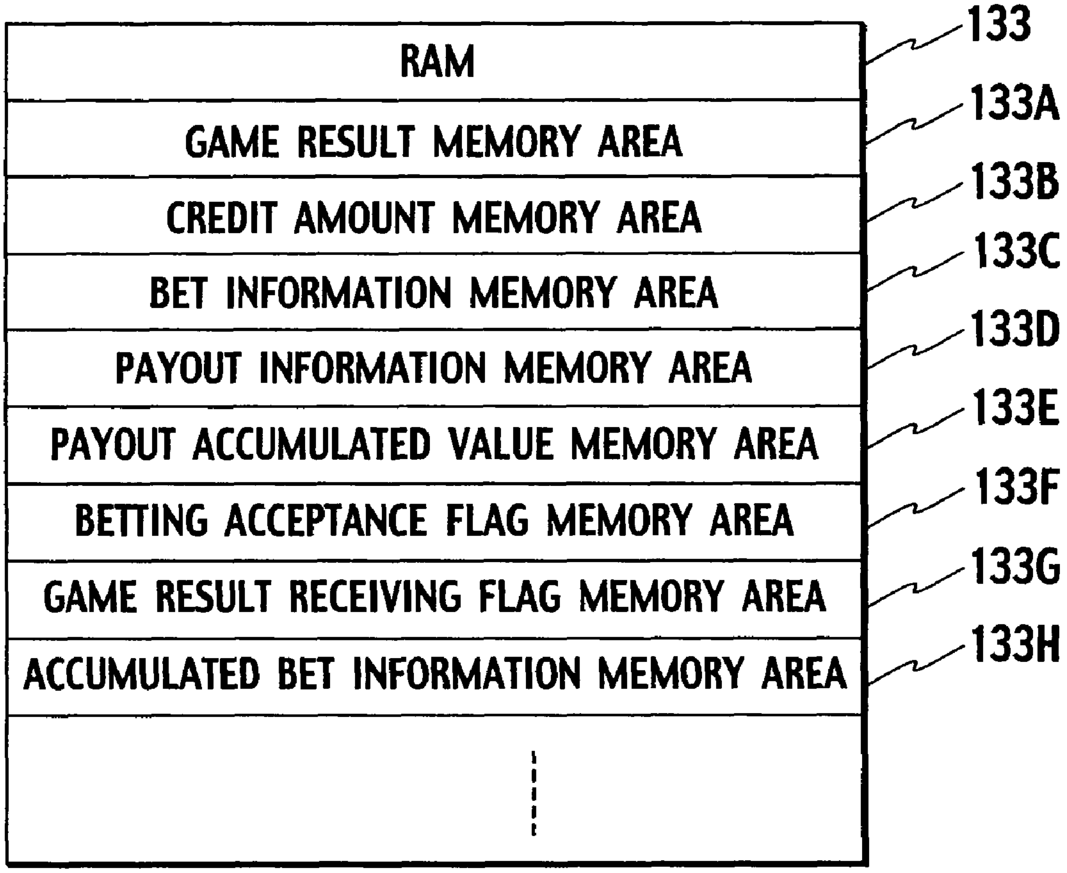
FIG. 12 is a schematic diagram showing data to be stored in a RAM of the gaming terminal of FIG. 11.

FIG. 12 is a schematic diagram showing a memory area of the RAM 133. As shown in FIG. 12, in the RAM 133, a game result memory area 133A, a credit amount memory area 133B, a bet information memory area 133C, a payout information memory area 133D, a payout accumulated value memory area 133E, etc. are provided. In the game result memory area 133A, the game results of the first card game and the supplementary card game received from the controller 150 are stored. In the credit amount memory area 133B, the credit amount possessed by that gaming terminal 120 (participant) is stored. This credit amount is managed by the controller 150, and transmitted from the controller 150 to the gaming terminal 120. In the bet information memory area 133C, the bet amount bet for each game at that gaming terminal 120 is stored. In the payout information memory area 133D, information (payout information) indicating sizes of the payouts for the first card game and the supplementary card game received from the controller 150 is stored for each game. In the payout accumulated value memory area 133E, an accumulated value of the payout information for the first card game and an accumulated value of the payout information for the supplementary card game are stored.

Also, to the CPU 131 (FIG. 11), bet confirmation buttons 135 and 136, a payout button 137, and a help button 138 provided in the switch unit 125 are connected.

The bet confirmation buttons 135 and 136 are press down buttons for confirming bets after the betting operation through the touch panel 124 of the terminal display 123, where the bet confirmation button 135 is a button for confirming the bet for the first card game and the bet confirmation button 136 is a button for confirming the bet for the second card game.

The payout button 137 is a button to be pressed down at a time of finishing the game, normally, and when this payout button 137 is pressed down, chips in a number according to the credit amount acquired by the participant through the games and the like (normally one chip for one credit) will be paid from the chip payout opening 122 (FIG. 8). The credit amount is stored in the credit amount memory area 153D of the RAM 153 of the controller 150.

These processings are executed by the CPU 131 upon receiving the operation results of the buttons.

The CPU 131 executes corresponding various types of processings according to signals outputted from the switch unit 125 as a result of pressing down the buttons of the switch unit 125 or the like. More specifically, the CPU 131 executes various types of processings according to signals supplied from the switch unit 125 based on the operation of the participant, and the data and programs stored in the ROM 132 and the RAM 133, and transmits their results to the CPU 151 of the controller 150 (FIG. 9).

Also, to the CPU 131, the hopper 126 is connected. The hopper 126 pays a prescribed number of chips from the chip payout opening 122 (FIG. 8), according to the control data from the CPU 131.

In addition, to the CPU 131, the terminal display 123 is connected through a liquid crystal driving circuit 135. The liquid crystal driving circuit 135 has a program ROM, an image ROM, an image control CPU, a work RAM, a VDP (video display processor), and a video RAM. In the program ROM, an image control program and various types of selection tables related to displays at the terminal display 123 are stored. In the image ROM, dot data for forming images to be displayed at the terminal display 123 are stored, for example. The image control CPU makes a determination of an image to be display on the terminal display 123 from the dot data stored in advance in the image ROM, according to the image control program stored in advance in the program ROM, based on parameters set by the CPU 131. The work RAM is formed as a temporary memory device at a time of executing the image control program at the image control CPU. The VDP forms an image according to a display content determined by the image control CPU, and outputs it to the terminal display 123. The video RAM is formed as a temporary memory device at a time of forming an image at the VDP.

On a front face of the terminal display 123, the touch panel 124 is provided, and an operation result of this touch panel 124 is transmitted to the CPU 131. The CPU 131 accepts the bets for the first card game and the supplementary card game individually, according to the operation result of the touch panel 124. When there is a bet input, the CPU 131 transmits that input result (the bet information) to the controller 150. The CPU 151 of the controller 150 stores this bet information into the RAM 153. A processing for accepting bets will be described below.

To the CPU 131, the speaker 128 is connected through an audio output circuit 129, and the speaker 128 generates various types of effect sounds according to signals from the audio output circuit 129.

To the CPU 131, the chip sensor 127 is connected. The chip sensor 127 detects chips inserted from the chip insertion slot (FIG. 8), and outputs this detection result to the CPU 131. The CPU 131 counts the number of inserted chips according to the detection result outputted from the chip sensor 127, and transmits that count result to the controller 140 (FIG. 8). The CPU 151 of the controller 150 increases the credit amount possessed by the gaming terminal 120 that is stored in the RAM 153, according to the count result transmitted from the gaming terminal 120.

Next, images to be displayed on the common display 101 and each terminal display 123 will be described.

Figure 13:
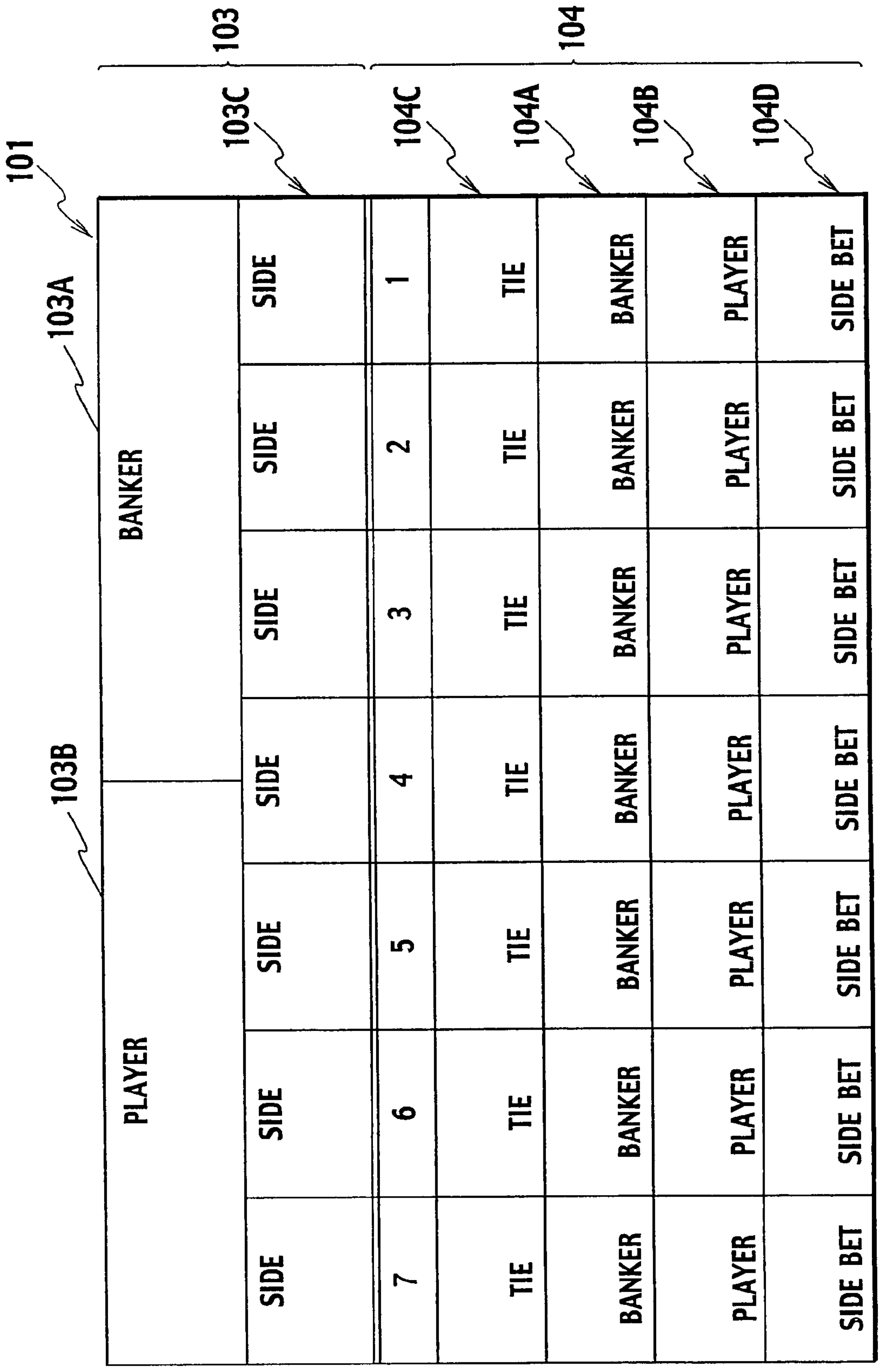
FIG. 13 is a front view showing a display on a common display of the gaming machine of FIG. 8.

FIG. 13 shows a display screen 102 of the common display 101, and on this display screen 102, the bet information indicating the content bet at each gaming terminal 120 is displayed by the CPU 151, and the first card game, the second card game and the supplementary card game executed by the CPU 151 are displayed.

In FIG. 13, on the display screen 102 of the common display 101, a first window 103 for displaying a proceeding state of the first card game, a proceeding state of the second card game, and a proceeding state of the supplementary card game, and a second window 104 for displaying contents bet at each gaming terminal 120 are provided. In the first window 103, a first display area 103A for displaying cards dealt to the Banker in the first card game (baccarat game), a second display area 103B for displaying cards dealt to the Player, and a third display area 103C for displaying cards dealt for the supplementary card game are provided. The third display area 103C is provided in plurality, one for each gaming terminal 120, according to the fact that a card will be allocated to each of the gaming terminals for which the generation of the prize is determined by the second card game among a plurality of the gaming terminals 120. The second card game will proceed according to the first display area 103A in which cards for the first card game are displayed and a color of an image of a card front face displayed in the second display area 103B.

The first display area 103A and the second display area 103B constitute a first display on which the cards for the first card game (baccarat game) are disclosed (the first card game is displayed) and the second card game is displayed, and the third display area 103C constitutes a second display on which cards for the supplementary card game (third card game) associated with the second card game are disclosed (the supplementary card game is displayed). In this embodiment, the case in which the first display area 103A, the second display area 103B and the third display area 103C (the first display and the second display) are formed on the same common display 101 will be described, but the present invention is not limited to this, and the first display including the first display area 103A and the second display area 103B, and the second display including the third display area 103C, may be formed separately.

In the second window 104, a first area 104A for displaying contents bet on the Banker's win, a second area 104B for displaying contents bet on the Player's win, a third area 104C for displaying contents bet on the tie, and a fourth area 104D for displaying contents bet for the second card game are provided. These first to fourth area 104A to 140D are provided in plurality in correspondence to a plurality of the gaming terminals 120. In the case of this embodiment, seven of the first to fourth areas 104A to 104D are provided according to the fact that seven of the gaming terminals 120 are provided.

Figure 14:
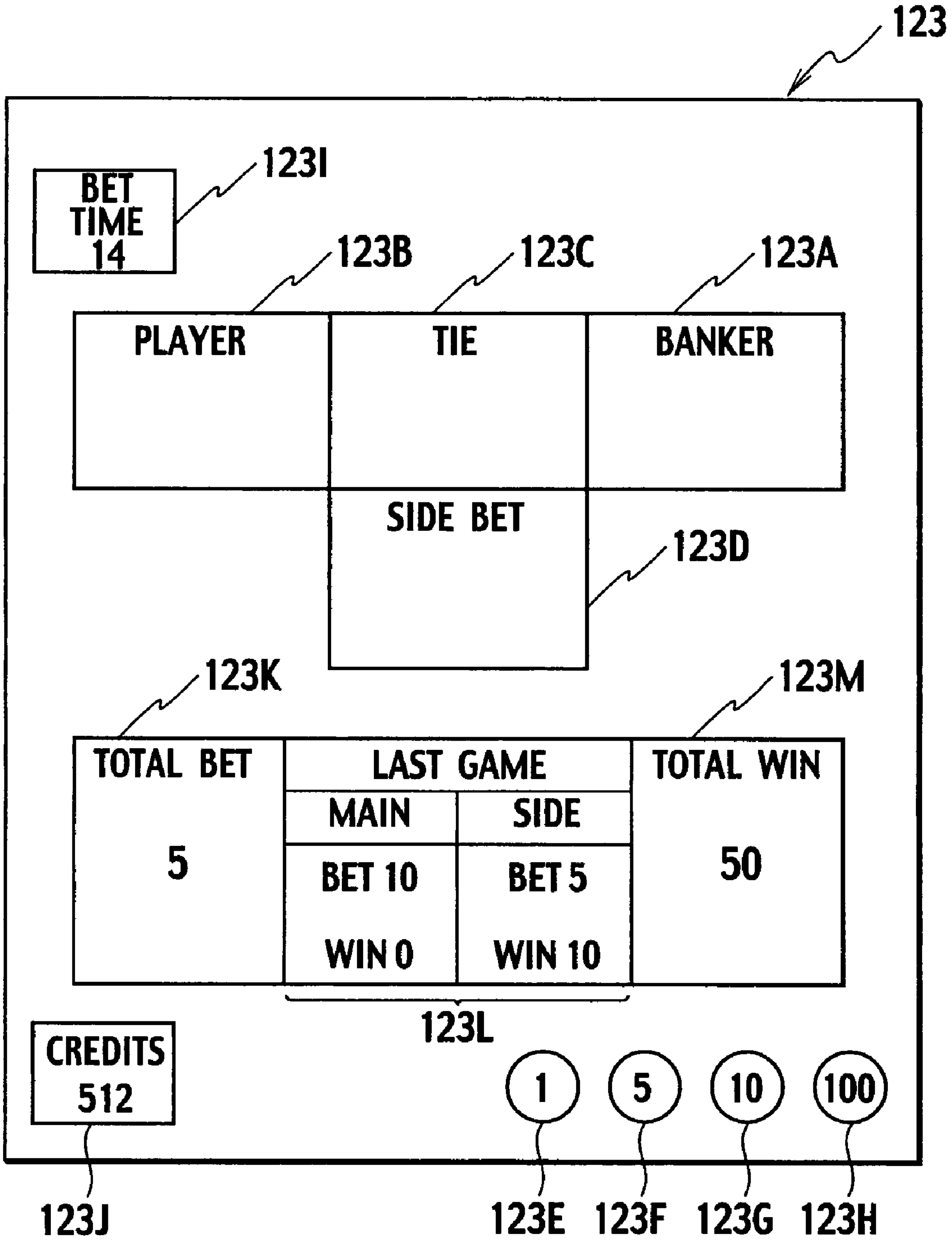
FIG. 14 is a front view showing a display on a terminal display of the gaming machine of FIG. 8.

FIG. 14 shows a display screen of each terminal display 123, on which a first bet region 123A for betting on the Banker's win, a second bet region 123B for betting on the Player's win, a third bet region 123C for betting on the tie, and a fourth bet region 123D for betting in the second card game are provided, for each one play of the first card game.

On the display screen of the terminal display 123, chip buttons 123E to 123H are provided. These chip buttons 123E to 123H are images of buttons for betting chips (any of 1, 5, 10 or 100 chips) in bet regions (the first to fourth bet regions) specified by the participant. In correspondence to types (sizes of an amount) of chips, the chip buttons 123E to 123H comprise four types of a 1 chip button 123E, a 5 chip button 123F, a 10 chip button 123G, and a 100 chip button 123H.

The CPU 131 of the gaming terminal 120 executes a betting acceptance processing according to a position at which a pressing operation is carried out, in response to a pressing operation of the touch panel 124 provided on a surface of the display screen of the terminal display 123.

Namely, the participant first specifies a region in which a bet is to be made, by carrying out a pressing operation of the touch panel 124 on a surface of the bet region to be bet (any of the first bet region 123A, the second bet region 123B, the third bet region 123C and the fourth bet region 123D), on the displayed screen. The CPU 131 of the gaming terminal 120 judges a specified region according to an operation result of this touch panel 124, and changes a display mode of that specified region. As examples of this change of the display mode, it is possible to adopt a manner for changing a background color of the specified region, a manner for changing a color of a frame of the specified region, a manner for changing a brightness of a background of the specified region, a manner for flashing a frame of the specified region, etc., for example.

Figure 15:
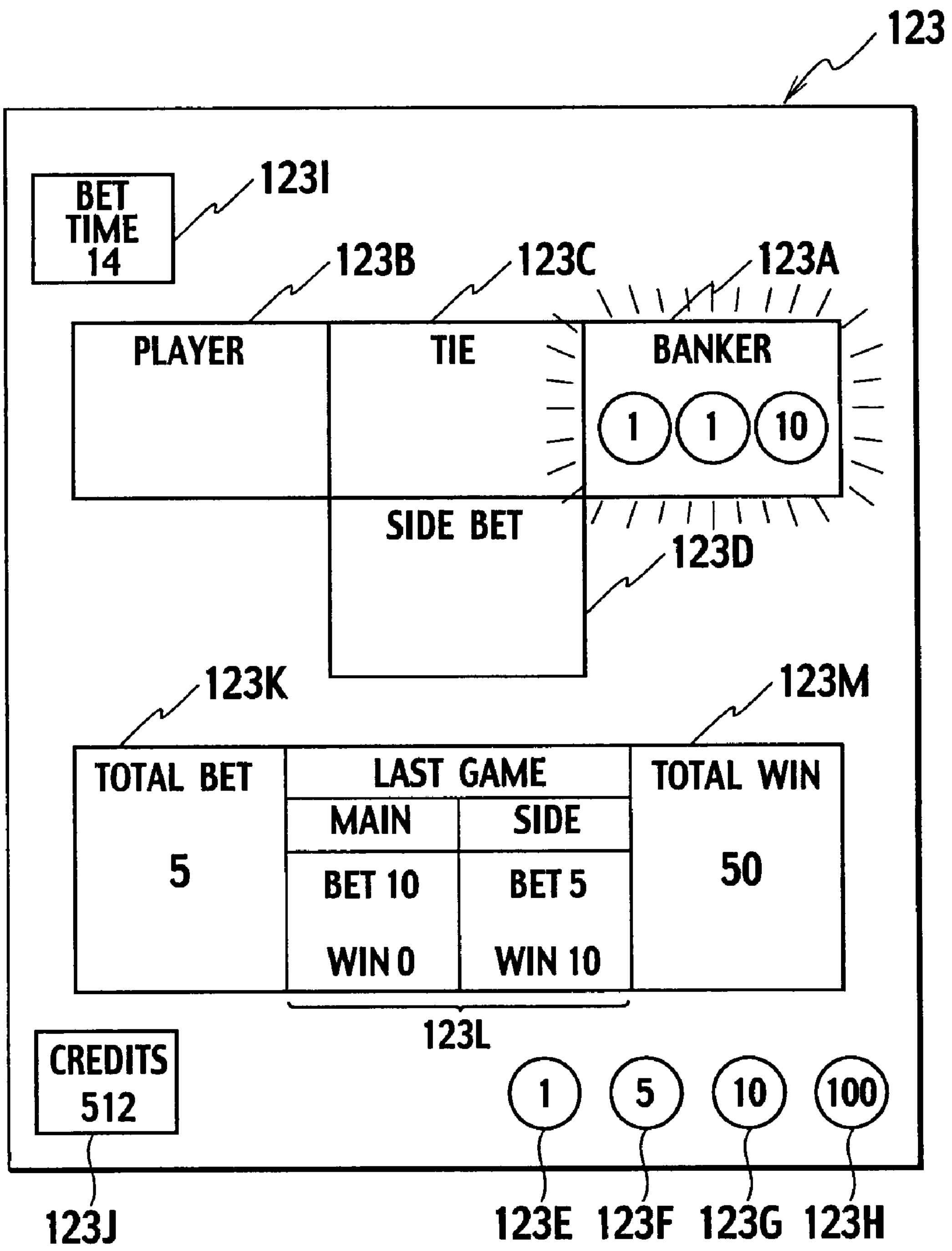
FIG. 15 is a plan view showing an exemplary display in a case where bets are made on a Banker at a terminal display of a gaming machine according to the second embodiment of the present invention.

Then, after that, specified chips are bet in the specified region as the participant carries out a pressing operation of the touch panel 124 on a surface of any of the chip buttons 123E to 123H. When there is a bet of a plurality of chips in the region specified for betting, the CPU 131 accepts this. In this way, as the participant specifies a region for betting and then carries out a pressing operation of the chip buttons for a plurality of times, chips in a number corresponding to that number of times will be bet. Also, in this case, by carrying out a pressing operation of a plurality of types of chip buttons (the 1 chip button 123E, the 5 chip button 123F, the 10 chip button 123G and the 100 chip button 123H) without limiting the bet buttons to be pressed to the identical button, chips of types corresponding to the pressed buttons will be bet in the specified region. For example, as shown in FIG. 15, by specifying the first region 123A for betting on the Banker's win, a frame of this first region 123A is flashed, and in this state, by pressing the 1 chip button 123E twice and the 10 chip button 123G once, two images indicating 1 chip and one image indicating 10 chips will be displayed in the first region 123A.

On the display screen of the terminal display 123, a credit amount display region 123J is provided. In this credit amount display region 123J, the credit amount possessed by the current participant is displayed. This credit amount is stored in the credit amount memory area 153D of the RAM 153 of the controller 150 in correspondence to each gaming terminal 120. When there is a change in the credit amount, the CPU 151 of the controller 150 updates the credit amount of the RAM 153 and transmits that update result to that gaming terminal 120 along with an identifier of the corresponding gaming terminal. The credit amount is subtracted when the participant bets chips, and added when there is a payout according to the game result.

At the gaming terminal 120, when the credit amount is transmitted from the controller 150, the credit amount stored in the credit amount memory area 133B of the RAM 133 is updated, and the updated credit amount is displayed in the credit amount display region 123J.

In this way, the credit amount displayed in the credit amount display region 123J is updated in real time, when there is a bet input, or when there is a payout according to the game result, etc.

On the display screen of the terminal display 123, a total bet amount display region 123K is provided. The CPU 131 counts a total number of chips bet in the bet regions 123A to 123D, for each one play of the first card game and the second card game, adds that count result to the accumulated value in an accumulated bet information memory area 133H of the RAM 133, and updates the information of the accumulated bet information memory area 133H by setting that addition result as a new accumulated value. Then, the CPU 131 displays this accumulated value in the total bet amount display region 123K.

On the display screen of the terminal display 123, a last game display region 123L is provided. The CPU 131 stores a total bet amount into the RAM 133 for each one play of the first card game and the second card game, and received information indicating sizes (acquired number of chips) of prizes generated according to a result of this game from the controller 150 and stores it into the RAM 133. Then, these information are displayed in the last game display region 123L. The information to be displayed in the last game display region 123L include a bet amount (BET) in the last play of the first card game (MAIN), a payout amount (WIN) acquired in the last play of the first card game (MAIN), a bet amount (BET) in the last play of the supplementary card game (SIDE) and a payout amount (WIN) acquired in the last play of the second card game (SIDE). A display of the bet amounts of the last play of the first card game and the second card game is started when the total bet amount is confirmed by the operation of the bet confirmation button 135A (FIG. 11), and a display of the information indicating sizes of prizes is started when one play of the first card game and the second card game is finished and the information indicating sizes of prizes is transmitted from the controller 150 to the gaming terminal 120. These displays are continued until the betting for a next game is started.

On the display screen of the terminal display 123, a total payout amount display region 123M is provided. When information (payout information) indicating sizes of prizes generated in the first card game and the second card game are received from the controller 150 for each play, the CPU 131 stores this payout information into the payout information memory area 133D (FIG. 12) of the RAM 133, for each play of the first card game and the second card game, calculates a total of the payout results of the first card game and the second card game, accumulates that total value for each play as the number of plays of the game increases, and stores this accumulated value into the payout accumulated value memory area 133E (FIG. 12) of the RAM 133. The CPU 131 reads out this accumulated value from the RAM 133, and displays it in the total payout amount display region 123M. The CPU 131 continues the calculation of this accumulated value and its storing into the RAM 133 until the total payout amount display region 123M is pressed. When the total payout amount display region 123M is pressed, the CPU 131 resets (rewrites to "0") the accumulated value of the payout amount regarding the first card game and the supplementary card game stored in the payout accumulated value memory area 133E of the RAM 133, and carries out an accumulation starting from a result of a next game. In this way, the accumulated value of the sizes (payout amounts) of the prizes obtained in the games after the resetting is displayed in the total payout amount display region 123M.

By the display of the total payout amount display region 123M, the participants can check the accumulated result of the payouts obtained by the first card game and the second card game. It may be made such that the accumulated results of the payouts for the first card game and the second card game are displayed separately in the total payout amount display region 123M. In this case, it suffices to store the payout accumulated value of the first card game and the payout accumulated value of the second card game separately, in the payout accumulated value memory area 133E of the RAM 133.

Thus, on the display screen of the terminal display 123, the image for operations by which the participant makes bets, the game result, and the payout result, regarding the first card game and the second card game, are displayed.

As a result, the participants can make bets for the first card game and the second card game and learn the results of the respective games, through this display screen.

Here, on the display screen of the terminal display 123, a bet time display region 123I is displayed. In this bet time display region 123I, a remaining time during which the participants can make bets is displayed. The CPU 131 displays a bet time (20 seconds in the case of this embodiment) set in advance in the bet time display region 123I, at a timing when the first card game and the second card game are finished. Then, along with this display, the CPU 131 activates an internal timer and subtracts the number displayed as the bet time one by one, according to its count result. In this way, the bet time displayed in the bet time display region 123I is decreased according to the remaining time during which the betting is possible. The CPU 131 finishes accepting the bets at a timing when this bet time becomes "0". The CPU 131 changes the display of the bet time display region 123IO from blue to yellow at a timing when the remaining time of the bet time becomes 10 seconds, and changes it from yellow to red at a timing when the remaining time becomes 5 seconds. In this way, the remaining time of the bet time becomes more easily comprehensible. Note that, instead of changing a color of the display according to the remaining time, it may be made such that the bet time display region 123I is flashed, and a period of this flashing is made shorter as the remaining time becomes less, for example.

Thus, at a timing when the first card game and the second card game are finished and the acceptance of the betting operation is started, "20" is displayed in the bet time display region 123I, this number is decreased by one in each one second, and the acceptance of the betting operation is finished when this number becomes "0".

Note that, when the bet time becomes 5 seconds remaining, the CPU 131 outputs a speech that is an advance notice of a start of the game from the speaker 128. Then, when the remaining of the bet time becomes "0", CPU 131 notifies the fact that the acceptance of bets is finished, to the CPU 151 of the controller 150. As a result, the CPU 151 starts the first card game and the second card game.

Figure 16:
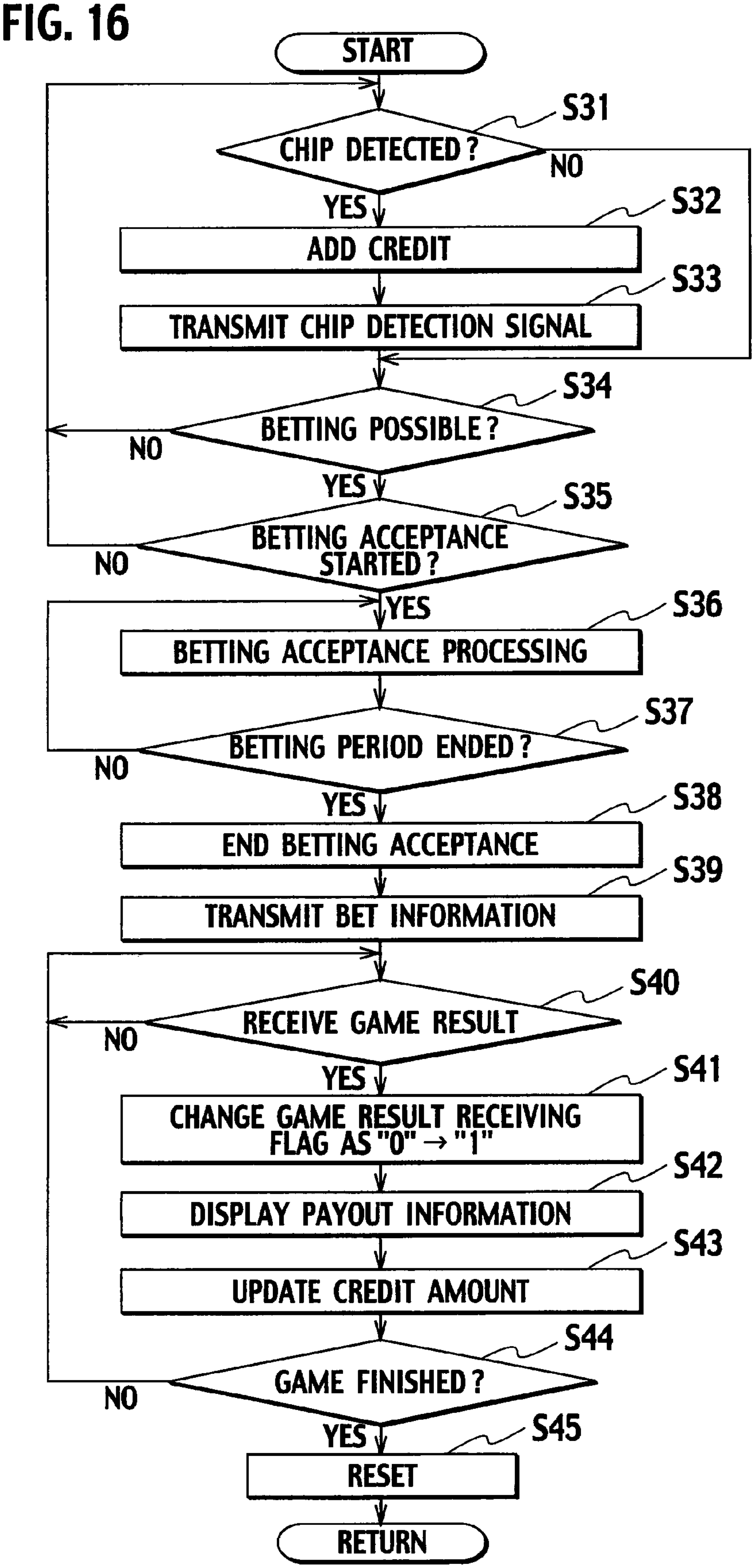
FIG. 16 is a flow chart showing a processing procedure of a CPU of a gaming terminal of a gaming machine according to the second embodiment of the present invention.

Next, a series of operations from a betting acceptance processing at the gaming terminal 120 up to an execution of the game at the gaming machine 100 will be described, FIG. 16 is a flow chart showing a series of processings from the acceptance of bets at the gaming terminal 120 up to a processing for paying the payout according to the game result.

As shown in FIG. 16, at the step S31, the CPU 131 of the gaming terminal 120 judges whether there is an insertion of chips or not, according to the detection result of the chip sensor 127. When the negative result is obtained at this step S31, this implies that chips are not inserted, so that the CPU 131 makes a transition to the step S34 to be described below. In contrast, when the affirmative result is obtained at the step S31, this implies that chips are inserted from the chip insertion slot 121, so that the CPU 131 makes a transition from the step S31 to the step S32.

At the step S32, the CPU 131 adds the number of inserted chips to the credit amount stored in the RAM 133, and at the subsequent step S33, the CPU 131 transmits the increased amount of the credit amount as a chip detection signal to the controller 150. The controller 150 stores this credit data into the RAM 153. In the gaming terminal 120, chips are accepted at any time even during the game, so that the update of the credit amount of the RAM 133 according to the chip insertion result and the transmission of the chip detection signal are carried out at any time.

In addition, at the step S34, the CPU 131 judges whether the betting is possible or not, according to the credit amount stored in the RAM 133 (the credit amount possessed by this gaming terminal 120). In the case of this embodiment, the betting is possible from one chip, so that in a case where the credit amount stored in the RAM 133 is greater than or equal to one, the CPU 131 obtains the affirmative result at the step S34 and makes a transition from the step S34 to the step S35. Also, in a case where the credit amount stored in the RAM 133 is 0, the CPU 131 obtains the negative result at the step S34 and returns from the step S34 to the step S31 described above. In this way, the CPU 131 repeats the processing of the step S31 to the step S34, until the chips are inserted and the betting becomes possible.

In addition, at the step S35, the CPU 131 judges whether the betting acceptance is to be started or not according to the betting acceptance flag stored in a betting acceptance flag memory area 133F of the RAM 133. The betting acceptance flag becomes a state permitting the betting acceptance in a case where both of the first card game and the second card game are finished. Namely, when the first card game and the second card game are finished, the controller 150 transmits the game result and the payout according to this game result to the gaming terminal 120. At the gaming terminal 120. The betting acceptance flag of the RAM 133 is changed from a betting prohibiting state to a betting permitting state, in a case where the payouts of both the first card game and the second card game are received completely. When this betting acceptance flag becomes the betting permitting state, the CPU 131 starts the betting acceptance. Namely, at the gaming terminal 120, the betting acceptance is started at a timing when both the first card game and the second card game are finished. Consequently, in a case where the betting acceptance flag of the RAM 133 is in the betting prohibiting state, the CPU 131 repeats the processing of the step S34 until that flag becomes the betting permitting state.

When the betting acceptance flag becomes the betting permitting state, the CPU 131 makes a transition from the step S35 to the step S36. Note that, at the gaming terminal 120, whether or not to make a bet for the second card game is an option of the participant, so that there is a case where only a bet for the first card game is made. In this case, the information indicating a bet for the first card game and the information indicating the absence of a bet for the second card game are stored into the RAM 133 of the gaming terminal 120 at a timing of the end of the betting period, and these information is transmitted from the gaming terminal 120 to the controller 150. These will be described below.

At the step S36, the CPU 131 displays a betting screen (FIG. 14) for accepting bets at the terminal display 123, and then accepts bets for the first card game and the second card games. The CPU 131 temporarily stores the operation result of the touch panel 124 provided on the terminal display 123 as the bet information for the first card game and the second card game, into the bet information memory area 133C of the RAM 133.

When the betting acceptance is started at the step S36, the CPU 131 activates the internal timer, and counts the elapsed time since a timing at which the betting acceptance is started. Then, the CPU 131 makes a transition to the step S37, and judges whether the betting acceptance period (the betting period) has ended or not according to the elapsed time obtained from the internal timer.

When the negative result is obtained at the step S37, this implies that the betting acceptance period has not ended, so that the CPU 131 returns to the step S36 described above and repeats the betting acceptance processing. In this way, the acceptance of the bets for the first card game and the supplementary card game is carried out simultaneously during the betting period.

Then, in a case where it is judged that the betting acceptance period has ended according to the count result of the internal timer, the CPU 131 obtains the affirmative result at the step S37, makes a transition from the step S37 to the step S38, and finishes the betting acceptance. In a case where is no bet input for the second card game during the betting period, the CPU 131 regards that it is not participating in the supplementary card game, and stores the fact that there is no bet for the second card game into the bet information memory area 133C.

When the betting acceptance is finished, at the step S39, the CPU 131 transmits the bet information regarding the first card game and the second card game that is stored in the RAM 133 during the betting acceptance period, to the controller 150.

When the betting acceptance is finished and the bet information is transmitted from the gaming terminal 120 to the controller 150, the controller 150 starts the first card game and the second card game. The processing procedure of the controller 150 for executing these card games will be described below.

Then, when the first card game and the second card game are finished, information indicating sizes of prizes acquired by that gaming terminal 120 (information indicating a number of chips acquired in the first card game and a number of chips acquired in the second card game individually) is attached to the game result and transmitted form the controller 150 to the gaming terminal 120. By receiving this game result, the gaming terminal 120 stores the sizes (numbers of chips) of the acquired prizes separately for the first card game and the second card game, into the payout information memory area 133D of the RAM 133, while displaying it in the last game display region 123L (FIG. 14) of the terminal display 123, and also executes a processing according to that game result. Note that the controller 150 updates the credit amount possessed by that gaming terminal 120 on the RAM 153, according to the sizes of the prizes acquired by the gaming terminal 120. The controller 150 also transmits this updated result to the gaming terminal 120, along with the information indicating the sizes of the prizes. The gaming terminal 120 updates the credit amount stored in the credit amount memory area 133B of the RAM 133 according to this information.

Namely, at the step S40, the CPU 131 judges whether the game result is received from the controller 150 or not. When the negative result is obtained here, this implies that the games are not finished yet, so that the CPU 131 repeats the processing of the step S40 until the game result is received.

Then, when the game result is transmitted from the controller 150 to the gaming terminal 120, the CPU 131 obtains the affirmative result at the step S40, and makes a transition from the step S40 to the step S41.

At the step S41, the CPU 131 rewrites a game result receiving flag of a game result receiving flag memory area 133G of the RAM 133 to “1”. The game result transmitted from the controller 150 to the gaming terminal 120 contains the game result of the first card game and the game result of the second card game, so that the game result of the first card game and the game result of the second card game are transmitted at once. Here, in a case where no bet is made for the second card game at the gaming terminal 120, information indicating the absence of the game result is transmitted as information indicating the game result of the second card game.

In this way, when the game result is received from the controller 150, the CPU 131 changes the game result receiving flag corresponding to that received game result, so that it is possible to judge whether the first card game and the second card game are finished or not, according to a state of this flag.

At the step S42, the CPU 131 displays the sizes of the prizes (payouts) generated for that gaming terminal 120 on the terminal display 123. More specifically, the CPU 131 displays a size of a prize regarding the first card game and a size of a prize regarding the second card game individually in the last game display region 123L shown in FIG. 14. In an exemplary display shown in FIG. 14, as a size of a prize acquired by that gaming terminal 120 in the first card game was 0 chip, “WIN 0” is displayed in an entry of “MAIN”, and also as a size of a prize acquired in the second card game was 10 chips, “WIN 10” is displayed in an entry of “SIDE”.

The gaming terminal 120 is receiving the credit amount updated in the RAM 153 of the controller 150 along with the game result, and at the step S43, the CPU 131 updates the credit amount of the RAM 133, and displays this credit amount in the credit amount display region 123J (FIG. 14).

The CPU 131 calculates the accumulated value of the sizes of the prizes generated for that gaming terminal 120, stores it into the payout accumulated value memory area 133E of the RAM 133, and displays it in the total payout amount display region 123M.

In addition, at the step S44, the CPU 131 judges whether the first card game and the second card game are finished or not. Namely, when the fact that the both games are finished s received from the controller 150, the CPU 131 judges whether the game results of both the first card game and the second card game or not by referring to the game result receiving flag of the RAM 133, and in a case where the game results of both are not received, the CPU 131 obtains the negative result and returns to the step S40 described above. In contrast, in a case where the game results of both are received, the CPU 131 obtains the affirmative result at the step S44, makes a transition to the step S45, where the game result receiving flag is reset from “1” to “0”, and then returns to the step S31 described above to repeat the similar processing.

Figure 17:
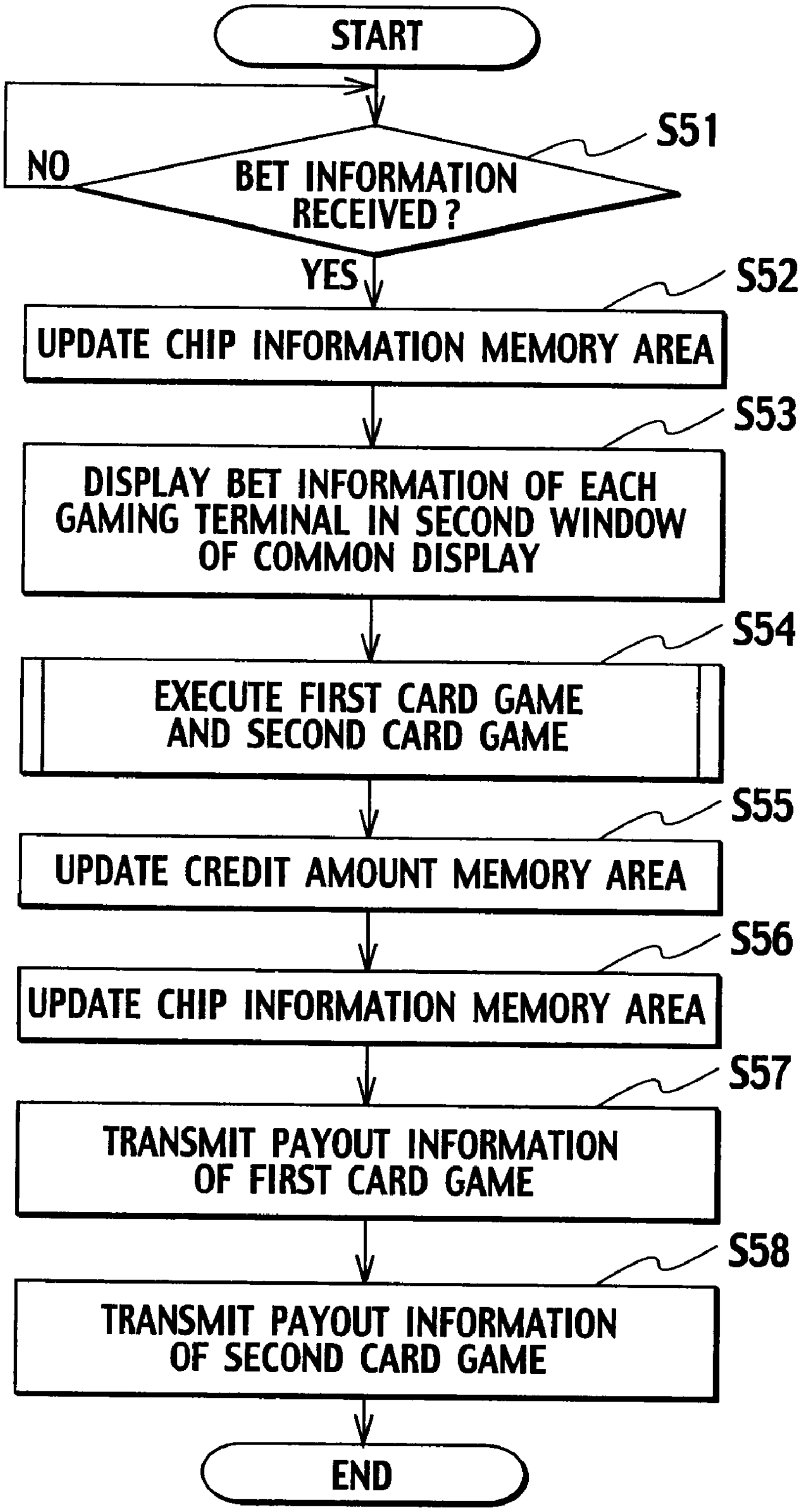
FIG. 17 is a flow chart showing a processing procedure of a CPU of a controller of a gaming machine according to the second embodiment of the present invention.

Next, a series of operations from the acceptance of the bet information until the transmission of the game result at the controller 150 is shown in FIG. 17. In FIG. 17, the step for receiving the credit amount information transmitted from the gaming terminal 120 to the controller 150 according to the insertion of chips is omitted, but this processing is carried out at any time, and when this information is received, the CPU 151 updates the credit amount stored in the RAM 153.

As shown in FIG. 17, at the step S51, the CPU 151 of the controller 150 judges whether the bet information is received from the gaming terminal 120 or not. When the negative result is obtained here, this implies that the betting period has not elapsed at the gaming terminal 120, so that the CFPU 151 repeats the processing of the step S51 until the bet information is received. At each gaming terminal 120, even in a case where there is no bet input within the bet time, the bet information (information indicating that the number of chips related to the bet is “0”) is transmitted to the controller 150. When the bet information is transmitted to the controller 150 from all the gaming terminals 120, the CPU 151 obtains the affirmative result at the step S51, and makes a transition from the step S51 to the step S52.

At the step S52, according to the bet information related to the first card game and the bet information related to the second card game received from each gaming terminal 120, the CPU 151 adds these amounts of chips bet to the amount of chips (the amount of chips possessed by the controller 150) stored in the chip information memory area 153G of the RAM 153, and updates this amount of chips.

Figure 18:
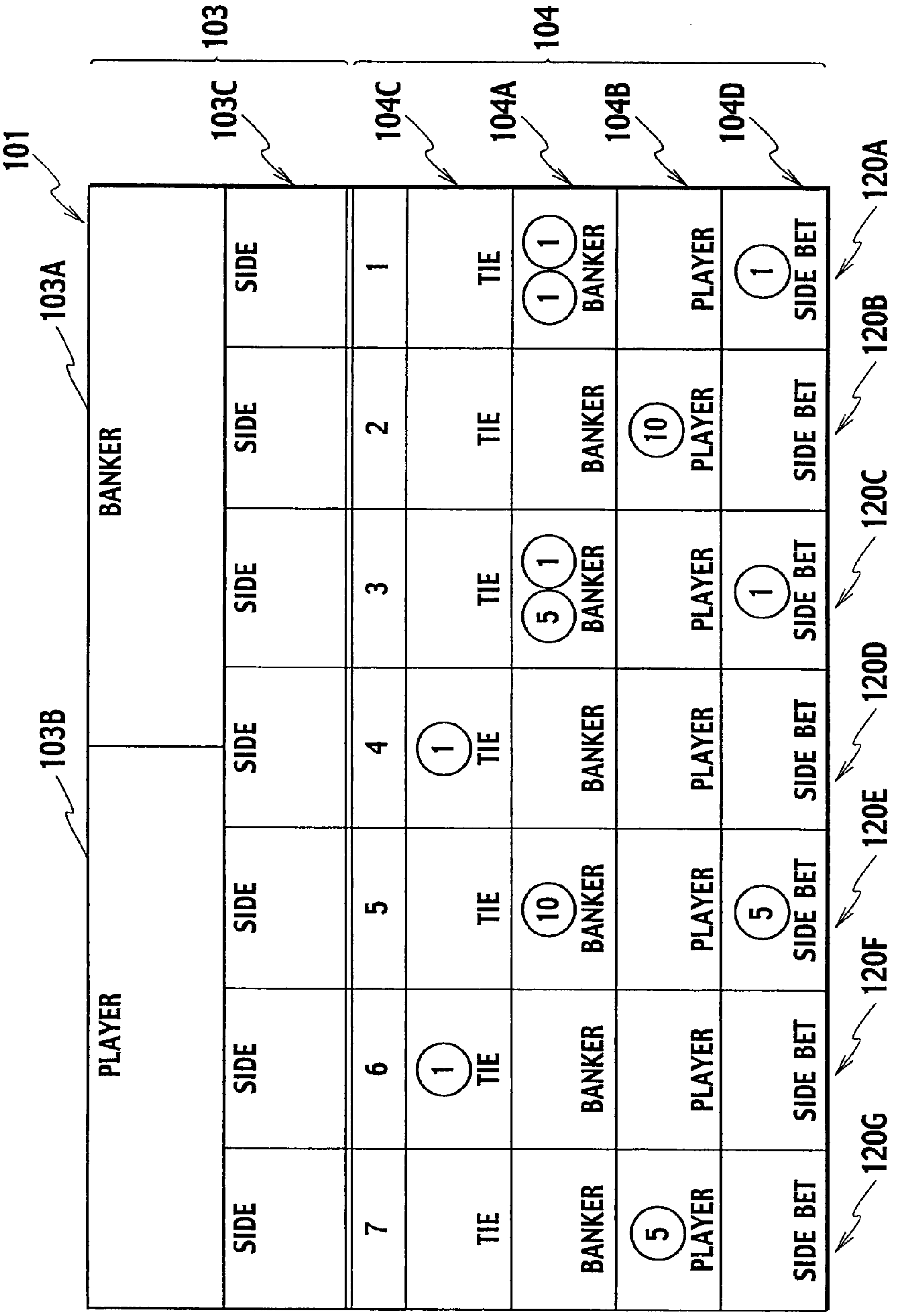
FIG. 18 is a front view showing an exemplary display of a bet information on a common display of a gaming machine according to the second embodiment of the present invention.

Then, at the step S53, the CPU 151 displays the bet information of each gaming terminal 120 in the second window 104 of the display screen 102 of the common display 101. For example, an exemplary display of the common display 101 shown in FIG. 18 is showing a state in which two chips are bet on the Banker for the first card game and one chip is bet for the second card game at the first gaming terminal 120A, ten chips are bet on the Player for the first card game at the second gaming terminal 120B, six chips are bet on the Banker for the first card game and one chip is bet for the second card game at the third gaming terminal 120C, one chip is bet on the tie for the first card game at the fourth gaming terminal 120D, ten chips are bet on the Banker for the first card game and five chips are bet for the second card game at the fifth gaming terminal 120E, one chip is bet on the tie for the first card game at the sixth gaming terminal 120F, and five chips are bet on the Player for the first card game at the seventh gaming terminal 120G.

Figure 19:
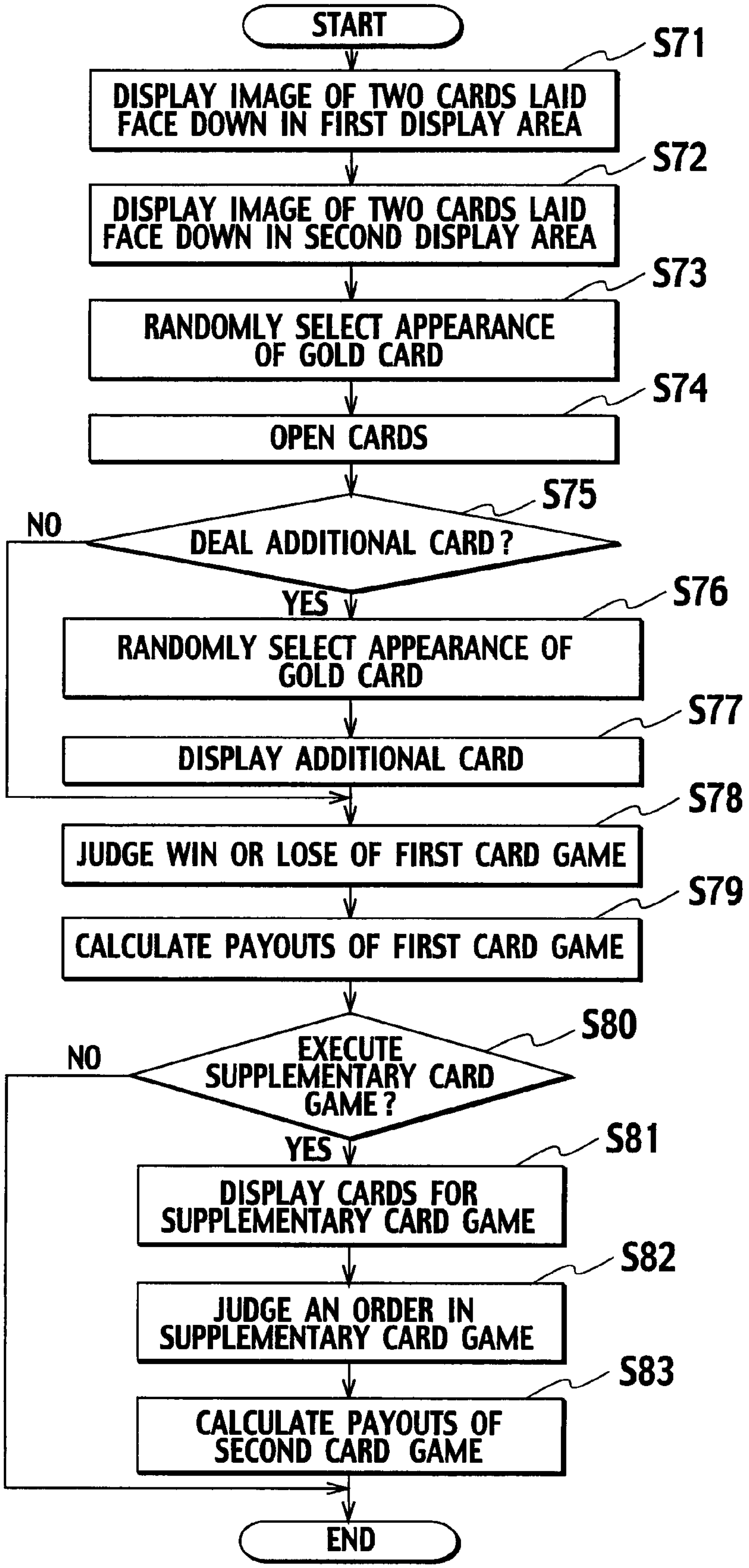
FIG. 19 is a flow chart showing a processing procedure of a CPU of a controller of a gaming machine according to the second embodiment of the present invention.

In this way, the CPU 151 displays the contents bet at the gaming terminals 120 (120A to 120G) on the common display 101, and then makes a transition to the step S54 and executes the card games (the first card game and the second card game). Namely, FIG. 19 shows a procedure for executing the first card game and the second card game which is to be executed by the CPU 151, and when the CPU 151 enters into this processing, the CPU 151 makes a transition to the step S71, and displays a state in which cards are dealt to the Banker in the first window 103 of the common display 101 (FIG. 13). Namely, the CPU 151 displays an image of a state in which two cards are laid face down in a region for arranging cards for the Banker (the first display area 103A) in the display screen 102 of the common display 101 shown in FIG. 13.

In addition, the CPU 151 makes a transition to the step S72, and displays a state in which cards are dealt to the Player in the first window 103 of the common display 101 (FIG. 13). Namely, the CPU 151 displays an image of a state in which two cards are laid face down in a region for arranging cards for the Player (the second display area 103B) in the display screen 102 of the common display 101 shown in FIG. 13.

Figure 20:
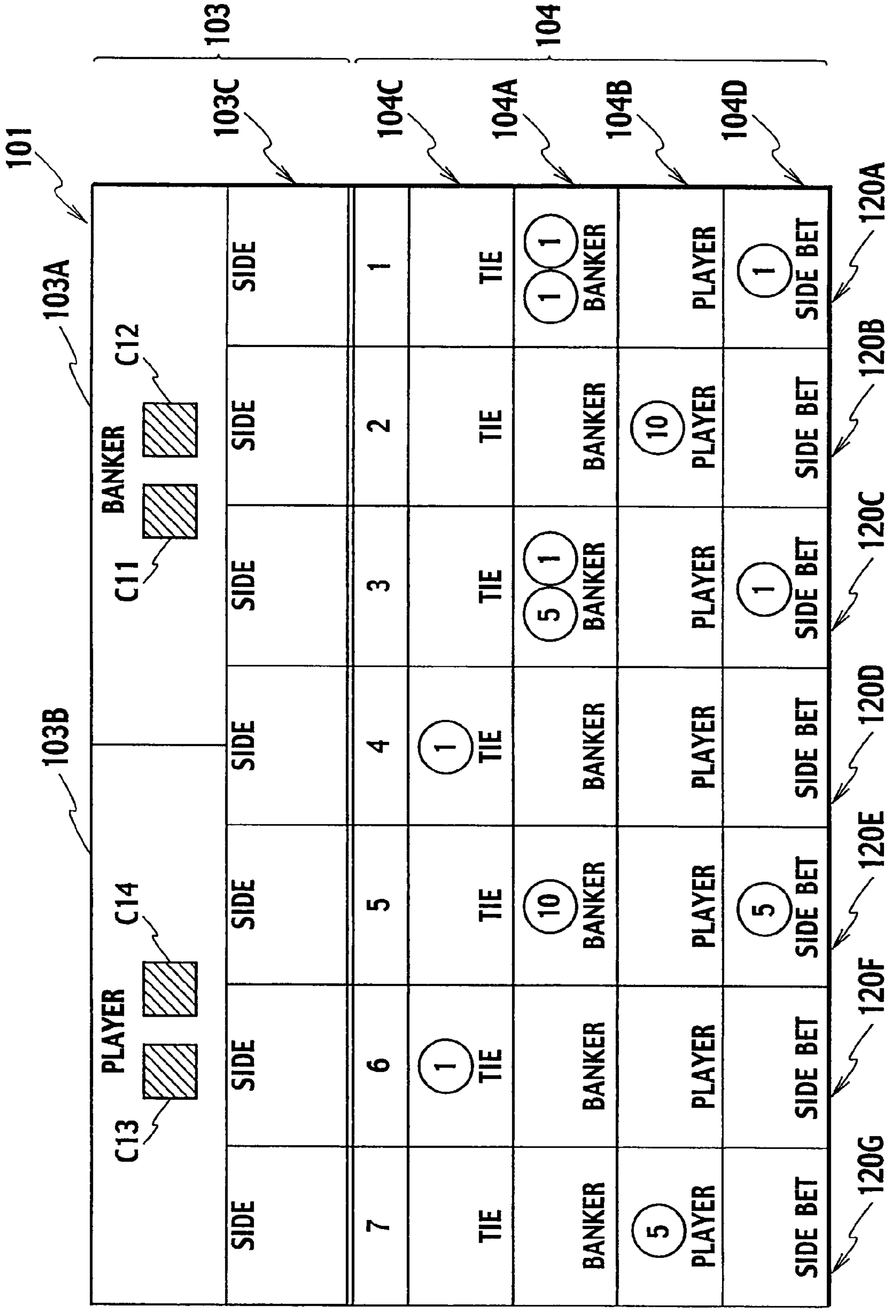
FIG. 20 is a front view showing an exemplary display of a card game on a common display of a gaming machine according to the second embodiment of the present invention.

In this way, as shown in FIG. 20, at the display screen 102 of the common display 101, an image of a state in which two cards C11 and C12 are laid face down in the first display area 103A (area for displaying cards of the Banker) and an image of a state in which two cards C13 and C14 are laid face down in the second display area (area for displaying cards of the Player) in the first window 103 for displaying the proceeding states of the first card game and the supplementary card game.

Then, the CPU 151 makes a transition to the step S73, and randomly selects whether or not to include a card for which a color of a front face on a side that is laid face down is the second color (gold) among the cards displayed in a state of being laid face down in the first and second display areas at the step S71 and the step S72 described above. Namely, the CPU 151 randomly determines whether or not to set any one of the cards displayed in the first and second display areas 103A and 103B to be the gold card. In this case, random number values are allocated to the displayed cards, and whether or not to set it to be the gold card is determined according to this random number value. A probability for making the gold card appear is stored in the appearance probability memory area 153H for the particular color in the RAM 153, and a correspondence relationship between a random number value and a state (whether or not to make the gold card appear) corresponding to that random number value is set according to this probability. This setting is also stored in the appearance probability memory area 153H for the particular color. In addition, at the step S76, in a case where it is determined to make the card of the particular color appear, the CPU 151 changes a flag of the particular color appearance flag memory area 153I of the RAM 153 from "0" to "1". This flag is reset to "0" every time one play of the game is finished.

In this way, when whether or not to set it to be the gold card is determined for each of the cards displayed in the first and second display areas 103A and 103B, the CPU 151 makes a transition to the step S74, and changes the cards displayed in the first and second display areas at the step S71 and the step S72 described above from a state of being laid face down to a state of being opened.

Figure 21:
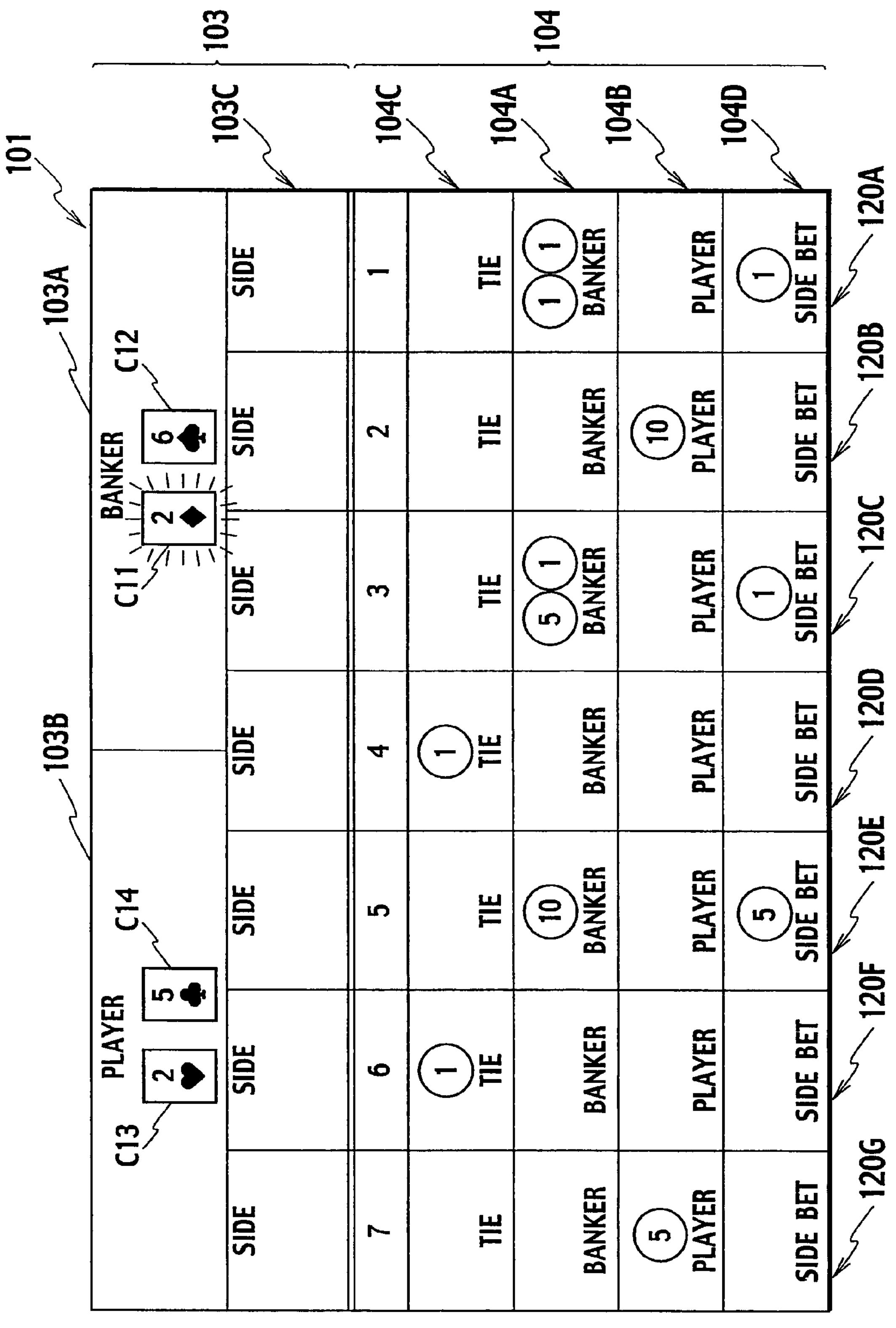
FIG. 21 is a front view showing an exemplary display of a card game on a common display of a gaming machine according to the second embodiment of the present invention.

As a result, as shown in FIG. 21, a state in which cards of the first display area 103A and the second display area 103B are opened is displayed. In this case, the CPU 151 randomly selects the suits and the ranks of the cards C11 to C14 from those determined in advance. The suits are selected from Diamond, Heart, Clover and Spade, and the ranks are selected from numbers 1 to 13. Then, in the first and second display areas 103A and 103B, an image of a state in which indications of the randomly selected suit and rank of each card are superposed on an image of a front face of the card is displayed. For example, in the first display area 103A, as an image of the card C11, a mark of Diamond as the suit and a numeral "2" as the rank are displayed and a state in which their indications are superposed on an image of a card front face is displayed. Also, as an image of the card C12, a mark of Spade as the suit and a numeral "6" as the rank are displayed and a state in which their indications are superposed on an image of a card front face is displayed. Also, in the second display are 103B, as an image of the card C13, a mark of Heat as the suit and a numeral "2" as the rank are displayed and a state in which their indications are superposed on an image of a card front face is displayed. Also, as an image of the card C14, a mark of Clover as the suit and a numeral "5" as the rank are displayed and a state in which their indications are superposed on an image of a card front face is displayed.

In a case where a determination to make the gold card appear is made at the step S73 described above, the CPU 151 displays an image of a front face of the corresponding card in gold (second color) according to that determination. For example, in a case where a determination to set the card C11 of the first display area 103A to be the gold card is made at the step S73 described above, a color of a card front face of that card C11 is displayed in gold, as shown in FIG. 21. By such a processing, a color of an image of a card front face for the first card game displayed on the common display 101 is randomly changed.

Then, the CPU 151 makes a transition to the step S75, and judges whether or not to deal an additional card to at least either one of the Banker and the Player, according to the game rules of the first card game (baccarat game) described above in the first embodiment.

In the case of an exemplary display shown in FIG. 21, an additional card will not be dealt to either one of the Banker and the Player according to the rules of the baccarat game, so that the cards of the baccarat game are ascertained to be total four cards of the Banker (the first display area 103A) and the Player (the second display area 103B) displayed at this point.

In a case where an additional card is necessary, the CPU 151 obtained the affirmative result at the step S75, and makes a transition from the step S75 to the step S76, where it randomly selects whether or not to make the gold card appear as the additional card, and then it displays the additional card in a state of being opened in at least either one of the first display area 103A and the second display area 103B, according to a result of the judgment based on the game rules at the step S77. The processing at the step S76 is similar to the processing at the step S73 described above.

Thus, on the common display 101, in the first display area 103A (area of the Banker) and the second display area 103B (area of the Player) of the first window 103 for displaying the first card game (baccarat game) and the second card game, an image of a state in which a plurality of cards are opened in conjunction with the proceeding of the first card game is displayed, as shown in FIG. 21. Then, the determination of the payouts of the first card game according to the opened cards, and the second card game in which the generation of prizes is determined according to whether there is a card (gold card) for which a color of a front face is a particular color (gold) or not among the opened cards will proceed.

Namely, at the step S78, the CPU 151 judges win or lose of the cards dealt to the first display area 103A (i.e., the Banker) and the cards dealt to the second display area 103B (i.e., the Player), according to the cards opened in the first display area 103A and the second display area 103B, for the first card game (baccarat game). This judgment of win or lose is such that one with the lower one digit of a total of the dealt cards closer to 9 among the Banker and the Player will win, according to the rules of the baccarat game, similarly as in the case of the first embodiment. Also, when the lower one digits are the same, it will be tie. Thus, a result of this judgment of win or lose becomes any one of the Banker's win, the Player's win, and the tie. Note that, at a time of calculating a total, it is calculated by regarding Ace (A) as 1, each of 2 to 10 as the same number as the number on that card, and each of picture cards (Jack (J), Queen (Q) and King (K)) as 10. The judged win or lose is stored in the game result memory area 153B of the RAM 153 (FIG. 10) as the game result of the first card game.

In the case of an exemplary display shown in FIG. 21, the lower one digit of a total of the cards of the Banker (the first display area 103A) is 8 (natural), and the lower one digit of a total of the cards of the Player (the second display area 103B) is 7, so that the Banker (the first display area 103A) is going to win.

Then, at the step S79, the CPU 151 calculates payouts for the gaming terminals 120 (120A to 120G) according to the win or lose of the first card game judged at the step S78 described above. Namely, each gaming terminal 120 has made a bet on any one of the Banker's win, the Player's win and the tie for the first card game (baccarat game), and a payout according to that bet is calculated for the gaming terminal 120 for which the game result and the bet content coincide.

In the case of an exemplary display shown in FIG. 21, the result of the first card game is the Banker's win, so that the payouts are calculated for the gaming terminals 120A, 120C and 120E that have made bets on the Banker's win. Namely, the payouts are calculated for the gaming terminals 120A, 120C and 120E that have their bet contents displayed in the first area 104A corresponding to the Banker's win in the second window 104 for displaying the bet contents of the gaming terminals 120.

In this case, at the first gaming terminal 120A, two chips are bet on the Banker's win, so that the payout is four chips obtained by adding the same amount of two chips to the bet chips. Also, at the third gaming terminal 120C, six chips are bet on the Banker's win, so that the payout is twelve chips. Also, at the fifth gaming terminal 120E, ten chips are bet on the Banker's win, so that the payout is twenty chips.

Note that the method for calculating the payouts of the baccarat game in the case where the bet on the Player's win becomes a winning bet is the same as in the case of the Banker's win, but in the case where the bet on the tie becomes a winning bet, the payout becomes a number of chips in which eight times the bet chips are added to the bet chips. This calculation result of the payout is stored in the payout amount memory area 153C of the RAM 153 along with information for identifying the gaming terminal 120 to which the payout is to be paid.

When the calculation of the payouts of the first card game is finished, the CPU 151 makes a transition to the step S80, and judges whether the supplementary card game is to be executed or not. At this step S80, the CPU 151 judges that a transition to the supplementary card game is to be made in a case where the flag in the particular color appearance flag memory area 153I of the RAM 153 is set as "1". Namely, in a case where the appearance of the card of the particular color (gold card) is to be made is selected at the step S73 and the step S76 described above, the flag in the particular color appearance flag memory area 153I of the RAM 153 is changed to "1". Consequently, in a case where this flag is "1", the gold card appears in the second card game, and there is a need to make a transition to the supplementary card game for determining sizes of prizes of that second card game, so that the CPU 151 makes a transition from the step S80 to the step S81, and displays an image of cards for the supplementary card game in a region for arranging cards for the supplementary card game (the third display area 103C) on the common display 101. In this case, the CPU 151 displays an image of cards for the supplementary card game in the third display area 103C corresponding to the gaming terminals that have made bets (side bets) for the second card game. The CPU 151 randomly selects a suit and a rank and displays a state in which an image of the selected suit and rank is superposed on an image of a card front face in the third display area 103C, as an image of a card to be displayed.

Figure 22:
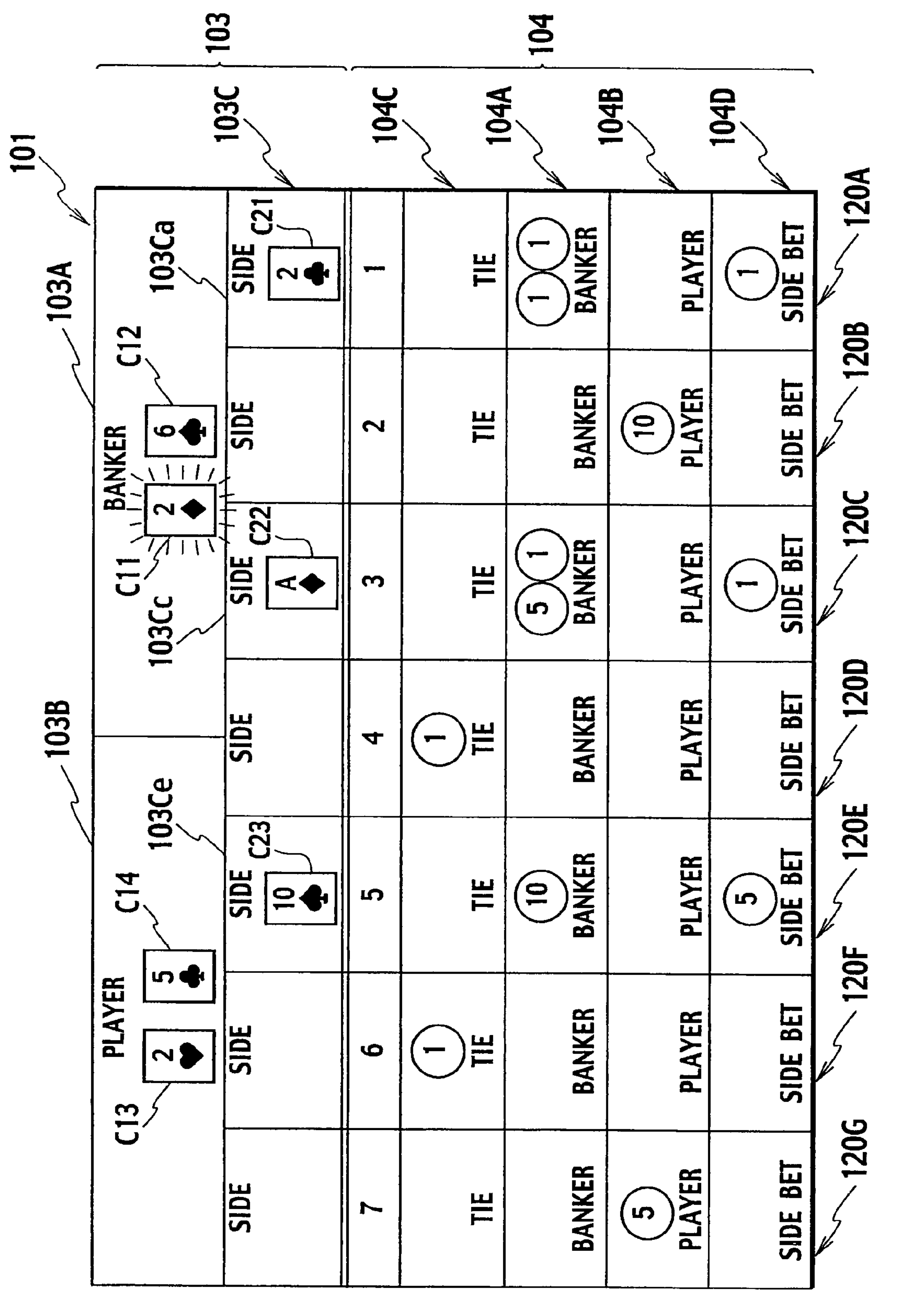
FIG. 22 is a front view showing an exemplary display of a card game on a common display of a gaming machine according to the second embodiment of the present invention.

In this way, as shown in FIG. 22, an image of a state in which cards C21, C22 and C23 are opened respectively in the display areas 103Ca, 103Cc and 103Ce, one card in each area, corresponding to the gaming terminals 120 that have made bets (side bets) for the second card game in the third display area 103C (the gaming terminals 120A, 120C and 120E in the case of an exemplary display shown in FIG. 22, for example), is displayed.

Then, at the step S83, the CPU 151 judges an order in the supplementary card game according to the cards for the supplementary card game displayed at the step S81 described above.

In this case, the CPU 151 judges an order of the cards C21, C22 and C23 displayed on the common display 101 for the purpose of the supplementary card game. As a method for judging this order, an order is determined as a descending order of the ranks of the cards dealt for the supplementary card game, for example. In the case of an exemplary display shown in FIG. 22, the rank of the card C21 is "2", the rank of the card C22 is "1 (Ace)", and the rank of the card C23 is "10", so that the card C23 becomes the first place, the card C21 becomes the second place, and the card C22 becomes the third place. As a result, the gaming terminal 120E corresponding to the area 103Ce in which the card C23 is displayed becomes the first place, the gaming terminal 120A corresponding to the area 103Ca in which the card C21 is displayed becomes the second place, and the gaming terminal 120C corresponding to the area 103Cc in which the card C22 is displayed becomes the third place.

When this order is judged, the CPU 151 makes a transition to the step S82, and calculates payouts for the gaming terminals 120A, 120C and 120E that have made the side bets, according to the order judged at the step S81.

The method for determining an order is not limited to the descending order of the ranks, and it may be determined by combining a type of the suit, etc.

As a method for determining the payouts, there is a method in which rates for bet chips are determined in advance according to the order, for example. In this case, a payout of three times chips bet by the participant is determined for the gaming terminal (participant) that became the first place in the supplementary card game, a payout of two times chips bet by the participant is determined for the participant who became the second place, and a payout of one time chips bet by the participant is determined for the participants who became the third or lower places. This determination method is stored in the payout rate memory area 153 F of the RAM 153. These payouts are to be paid to the participants in addition to the bet chips.

As a method for determining the payouts at the step S82, it is possible to adopt other methods such as that in which the payout rate (a rate for bet chips) is changed according to the number of the participants who made bets for the second card game, for example, without being limited to the method described above.

In the above description, the size of the prize is determined according to a result of the supplementary card game in a case where the generation of the prize is determined in the second card game, but the present invention is not limited to this, and it may be made such that a payout determined in advance is paid to the corresponding participants in a case where the gold card is made to appear, without carrying out the supplementary card game of the step S81 and the step S82.

Then, the CPU 151 finishes one play of the card games (step S54 (FIG. 17)), and makes a transition to the step S55 of FIG. 17. At the step S55, the CPU 151 updates the credit amounts possessed by the gaming terminals 120 that are stored in the credit amount memory area 153D of the RAM 153, according to the payouts calculated at the step S79 and the step S82 described above. Namely, among the credit amounts possessed by the gaming terminals 120 that are stored in the credit amount memory area 153D, the credit amounts of those gaming terminals 120 that acquired the payouts are increased as much as these payouts.

Then, at the step S56, the CPU 151 updates the chip information in the chip information memory area 153G, by subtracting the amounts of the payouts related to the first card game and the amounts of the payouts related to the supplementary card game that are paid to the gaming terminals 120, from the chip information (the amount of chips possessed by the controller 150) that is stored in the chip information memory area 153G of the RAM 153.

Then, at the step S57, the CPU 151 transmits the payout information indicating the payout of the first card game calculated at the step S79 described above to the gaming terminal 120 to which that payout is to be paid, and further at the step S58, the CPU 151 transmits the payout information indicating the payout of the second card game calculated at the step S82 described above to the gaming terminal 120 to which that payout is to be paid. When the payout information related to the first card game and the payout information related to the second card game are transmitted, the CPU 151 finishes one play of the card games.

Thus, in the gaming machine 100 of this embodiment, during the first card game (baccarat game) is executed once, the second card game is executed according to the cards dealt for that first card game, and when the generation of a prize is determined in the second card game due to the appearance of the gold card, the size of that prize (payout) is determined by the supplementary card game.

Namely, in the baccarat game, at least two cards allocated to each of the Banker and the Player (total four cards) are displayed. Here, an image of a card displayed for the first card game is displayed in a state in which an image of a suit and a rank is superposed on an image of a card front face. A color of an image of a card front face is randomly selected as either one of the first color (white in the case of this embodiment) and the second color (gold in the case of this embodiment) that is a particular color. In a case where the second color is selected, the generation of prizes for the gaming terminals (participants) which made bets for the second card game is determined.

Thus, every time the first card game is carried out once, a participant can make a bet for the second card game as an option, along with a bet for the first card game, and in the supplementary card game, a card game of a type different from the first card game is executed. In this way, it becomes possible for a participant to make a plurality of bets for different games during one play of the card game.

Also, when the generation of a prize in the second card game is determined, the supplementary card game for determining a size of that prize is executed, so that it becomes possible to give an opportunity of the supplementary card game associated with the second card game in addition, to the participant. In this way, the satisfaction of the participant can be improved further.

Also, according to the playing method of card games and the gaming machine according to the present invention, as it is made possible for a participant to make a plurality of bets for different types of games during one play of the card game, a density of a card game that can be enjoyed by a participant with respect to a time required for the card game can be made higher, and the satisfaction of the participant with respect to the card game can be improved.

The playing method and gaming machine according to the embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiment of the present invention are only a list of optimum effects achieved by the present invention. Hence, the effects of the present invention are not limited to those described in the embodiment of the present invention.

What is claimed is:

1. A gaming machine, comprising:

a gaming terminal configured to accept bets for participating in a card game including a first card game and a second card game;

a first display configured to display the first card game and the second card game;

a second display configured to display the third card game associated with the second card game; and a controller configured for an execution of the card game to, (a) accept a first bet for participating in the first card game, (b) accept a second bet for participating in the second card game, the second bet being accepted from each of a plurality of participants of the first card game, (c) display on the display suits and ranks of cards for the first card game, the suits and ranks being superposed on images of front faces of the cards for the first card game, (d) settle the first bet according to rules of the first card game, based on ranks of the displayed cards for the first card game, (e) randomly change colors of the images of the front faces of any of the cards for the first card game displayed on the display, (f) determine a generation of a prize for the second card game, based on the changed colors, (g) determine the generation of prizes for a plurality of participants having made second bets, and (h) execute the third card game for determining an order of sizes of the prizes for the plurality of participants, the prizes for the second card game being generated for the plurality of participants, wherein in the third card game, the controller is configured to allocate a prescribed number of cards to each of the plurality of participants being targets of the generation of the prizes in the second card game, disclose the allocated cards on the second display, and determine the order according to the disclosed cards.

2. The gaming machine as described in claim 1, wherein the first card game is a baccarat game.

3. A gaming machine, comprising:

a gaming terminal configured to accept bets for participating in a card game including a first card game and a second card game;

a first display configured to display the first card game and the second card game;

a second display configured to display a third card game associated with the second card game; and a controller configured for an execution of the card game to, (a) accept a first bet for participating in the first card game, (b) accept a second bet for participating in the second card game, (c) display on the display suits and ranks of cards for the first card game, the suits and ranks being superposed on images of front faces of the cards for the first card game, (d) settle the first bet according to rules of the first card game, based on ranks of the displayed cards for the first card game, (e) randomly change colors of the images of the front faces of any of the cards for the first card game displayed on the first display, (f) determine a generation of a prize for the second card game, based on the changed colors, and (g) execute the third card game for determining a size of the prize upon the generation of the prize being determined, by allocating a prescribed number of cards to a participant being a target of the generation of the prize in the second card game, disclosing the cards as allocated on the second display, and determining the size of the prize according to the cards as disclosed.

4. A gaming machine, comprising:

a gaming terminal configured to accept bets for participating in a card game including a first card game and a second card game;

a first display configured to display the first card game and the second card game;

a second display configured to display a third card game associated with the second card game; and a controller configured for an execution of the card game to, (a) accept each of first bets for each of a plurality of participants to participate in the first card game, (b) accept each of second bets for each of the plurality of participants of the first game to participate in the second card game, (c) display on the display suits and ranks of cards for the first card game, the suits and ranks of cards being superposed on images of front faces of the cards for the first card game, (d) settle the first bets according to rules of the first card game, based on ranks of the displayed cards for the first card game, (e) randomly change colors of the images of the front faces of any of the cards for the first card game displayed on the first display, (f) determine a generation of prizes for the second card game for a plurality of participants having made second bets, based on the changed colors, and (g) execute the third card game for determining an order of sizes of the prizes for the plurality of participants of the second card game upon the generation of the prizes being determined, by allocating a prescribed number of cards to each of participants being targets of the generation of the prizes in the second card game, disclosing the cards as allocated on the second display, and determining the order of sizes of the prizes according to the cards as disclosed.

5. A gaming machine, comprising:

a gaming terminal configured to accept bets for participating in a card game including a baccarat game and an optional card game;

a first display configured to display the baccarat game and the optional card game;

a second display configured to display a supplementary card game associated with the optional card game; and a controller configured for an execution of the card game to, (a) accept a first bet for participating in the baccarat game, (b) accept a second bet for participating in the optional card game, (c) display images of two cards for the baccarat game in each of a first area and a second area of the display, suits and ranks being superposed on images of front faces of the two cards, (d) determine whether or not to additionally display an image of a card for the baccarat game in at least one of the first area and the second area according to rules of the baccarat game, based on ranks of the displayed cards for the baccarat game, and execute a result of that determination, (e) determine any one of win, lose and tie among the cards displayed in the first area and the cards displayed in the second area according to the rules of the baccarat game, based on the ranks of the cards displayed in the first area and the ranks of the cards displayed in the second area, (f) settle the first bet according to the rules of the baccarat game, based on the determined win, lose or tie, (g) randomly change colors of the images of the front faces of any of the cards displayed on the display, (h) determine a generation of a prize for the optional card game, based on the changed colors, and (i) execute the supplementary card game for determining a size of the prize upon the generation of the prize being determined, by allocating a prescribed number of cards to a participant being a target of the generation of the prize in the optional card game, disclosing the cards as allocated on the second display, and determining the size of the prize according to the cards as disclosed.

6. A gaming machine, comprising:

a gaming terminal configured to accept bets for participating in a card game including a baccarat game and an optional card game;

a first display configured to display the baccarat game and the optional card game;

a second display configured to display a supplementary card game associated with the optional card game; and a controller configured for an execution of the card game to, (a) accept a first bet for participating in the baccarat game, (b) accept a second bet for participating in the optional card game, (c) display images of two cards for the baccarat game in each of a first area and a second area of the first display, suits and ranks being superposed on images of front faces of the two cards, (d) determine whether or not to additionally display an image of a card for the baccarat game in at least one of the first area and the second area according to rules of the baccarat game, based on ranks of the displayed cards for the baccarat game, and execute a result of that determination, (e) determine any one of win, lose and tie among the cards displayed in the first area and the cards displayed in the second area according to the rules of the baccarat game, based on the ranks of the cards displayed in the first area and the ranks of the cards displayed in the second area, (f) settle the first bet according to the rules of the baccarat game, based on the determined win, lose or tie, and (g) randomly change colors of the images of the front faces of any of the cards displayed on the first display, (h) determine a generation of a prize for the optional card game, based on the changed colors, and (i) execute the supplementary card game for determining a size of the prize upon the generation of the prize being determined, by allocating a prescribed number of cards to a participant being a target of the generation of the prize in the optional card game, disclosing the cards as allocated on the second display, and determining the size of the prize according to the cards as disclosed.

7. A gaming machine, comprising:

a gaming terminal configured to accept bets for participating in a card game including a baccarat game and an optional card game;

a first display configured to display the baccarat game and the optional card game;

a second display configured to display a supplementary card game associated with the optional card game; and a controller configured for an execution of the card game to, (a) accept each of first bet for each of a plurality of participants to participate in the baccarat game, (b) accept each of second bets for each of the plurality of participants of the baccarat game to participate in the optional card game, (c) display images of two cards for the baccarat game in each of a first area and a second area of the first display, suits and ranks being superposed on images of front faces of the two cards, (d) determine whether or not to additionally display an image of a card for the baccarat game in at least one of the first area and the second area according to rules of the baccarat game, based on ranks of the displayed cards for the baccarat game, and execute a result of that determination, (e) determine any one of win, lose and tie among the cards displayed in the first area and the cards displayed in the second area according to the rules of the baccarat game, based on the ranks of the cards displayed in the first area and the ranks of the cards displayed in the second area, (f) settle the first bets according to the rules of the baccarat game, based on determined win, lose or tie, and (g) randomly change colors of the images of the front faces of any of the cards displayed on the first display, (h) determine a generation of prizes for the optional card game for a plurality of participants having made second bets, based on the changed colors, and (i) execute the supplementary card game for determining an order of sizes of the prizes for the plurality of participants of the optional card game upon the generation of the prizes being determined, by allocating a prescribed number of cards to each of participants being targets of the generation of the prizes in the optional card game, disclosing the cards as allocated on the second display, and determining the order of sizes of the prizes according to the cards as disclosed.

8. The gaming machine as described in claim 3, wherein the controller is configured to allocate the prescribed number of cards to the participant for the third card game separately from the first and second card games.

* * * * *